US012320635B2

(12) United States Patent
Hamner et al.

(10) Patent No.: US 12,320,635 B2
(45) Date of Patent: Jun. 3, 2025

(54) MEASURING PROBE WITH FIELD GENERATING COIL CONFIGURATION AND TEMPERATURE COMPENSATION

(71) Applicant: Mitutoyo Corporation, Kanagawa-ken (JP)

(72) Inventors: Christopher Richard Hamner, Kirkland, WA (US); Scott Allen Harsila, Shoreline, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 370 days.

(21) Appl. No.: 18/147,553

(22) Filed: Dec. 28, 2022

(65) Prior Publication Data
US 2024/0219163 A1    Jul. 4, 2024

(51) Int. Cl.
*G01B 5/008* (2006.01)
*G01B 5/00* (2006.01)
*G01B 5/012* (2006.01)

(52) U.S. Cl.
CPC ........... *G01B 5/012* (2013.01); *G01B 5/0014* (2013.01)

(58) Field of Classification Search
CPC ........ G01B 5/008; G01B 5/012; G01B 5/016; G01B 5/0014
USPC .................................................. 33/503, 559
See application file for complete search history.

(56) References Cited

U.S. PATENT DOCUMENTS

| 2,584,592 A | 2/1952 | Kehbel | |
| 3,869,799 A * | 3/1975 | Neuer | B23Q 1/36 33/561 |
| 4,177,568 A * | 12/1979 | Werner | G01B 11/007 33/561 |

(Continued)

FOREIGN PATENT DOCUMENTS

| DE | 3526560 A1 | 2/1987 |
| DE | 10312919 A1 | 10/2004 |
| JP | 2001147102 A | 5/2001 |

OTHER PUBLICATIONS

Extended European Search Report, mailed May 14, 2024, for European Patent Application No. 23219562.8. (20 pages).

(Continued)

*Primary Examiner* — George B Bennett
(74) *Attorney, Agent, or Firm* — Seed IP Law Group LLP

(57) ABSTRACT

A measuring probe for a coordinate measuring machine is provided. The measuring probe includes a stylus position detection portion, signal processing and control circuitry and a temperature dependent compensation portion. The stylus position detection portion includes a field generating coil configuration and a sensing coil configuration. The temperature dependent compensation portion includes a temperature dependent component that is coupled to a field generating coil of the field generating coil configuration such that a change in a characteristic of the temperature dependent component due to an increase in temperature of the temperature dependent component causes relatively more current to flow through the field generating coil when driven by the coil drive signal than if the characteristic of the temperature dependent component had not changed. Such implementations are configured to increase the accuracy of the processed signals by at least partially compensating for certain affects that occur due to temperature changes.

20 Claims, 19 Drawing Sheets

(56) References Cited

U.S. PATENT DOCUMENTS

| | | | |
|---|---|---|---|
| 4,651,405 A | 3/1987 | McMurtry | |
| 4,701,704 A * | 10/1987 | Fukuyoshi | G01B 7/012 33/558 |
| 4,810,966 A | 3/1989 | Schmall | |
| 5,209,131 A * | 5/1993 | Baxter | G01B 7/012 33/559 |
| 5,239,283 A | 8/1993 | Wiesgickl | |
| 5,778,551 A * | 7/1998 | Herklotz | G01B 7/34 33/503 |
| 5,841,274 A | 11/1998 | Masreliez et al. | |
| 5,886,519 A | 3/1999 | Masreliez et al. | |
| 5,973,494 A | 10/1999 | Masreliez et al. | |
| 6,005,387 A | 12/1999 | Andermo et al. | |
| 6,011,389 A | 1/2000 | Masreliez et al. | |
| 6,043,644 A | 3/2000 | de Coulon et al. | |
| 6,525,530 B1 | 2/2003 | Jansson et al. | |
| 6,859,762 B2 | 2/2005 | Mawet | |
| 6,971,183 B2 | 12/2005 | Brenner et al. | |
| 7,076,883 B2 * | 7/2006 | Yamamoto | G01B 3/008 33/561 |
| 7,307,392 B2 | 12/2007 | Kang et al. | |
| 7,323,863 B2 | 1/2008 | Mawet | |
| 7,652,275 B2 | 1/2010 | Gladnick | |
| 8,438,746 B2 | 5/2013 | Usui | |
| 9,377,284 B2 * | 6/2016 | McMurtry | G01B 7/012 |
| 9,435,663 B2 | 9/2016 | Cook | |
| 9,726,482 B2 * | 8/2017 | Iseli | G01B 21/047 |
| 9,772,202 B1 | 9/2017 | Cook | |
| 9,791,262 B2 | 10/2017 | Harsila et al. | |
| 9,989,347 B2 * | 6/2018 | Jonas | G01B 21/045 |
| 10,145,666 B2 | 12/2018 | Jansson | |
| 10,184,773 B2 | 1/2019 | Jansson | |
| 10,197,375 B2 * | 2/2019 | Sakai | G01B 5/016 |
| 10,845,182 B2 * | 11/2020 | Paduch | G02B 6/3624 |
| 10,866,080 B2 | 12/2020 | Cook et al. | |
| 10,914,570 B2 | 2/2021 | Hamner et al. | |
| 11,543,899 B2 * | 1/2023 | Hamner | G06F 3/03545 |
| 11,644,298 B2 * | 5/2023 | Hamner | G01B 7/012 33/503 |
| 11,644,299 B2 * | 5/2023 | Hamner | G01D 5/2053 33/503 |
| 11,740,064 B2 | 8/2023 | Hamner | |
| 2005/0166413 A1 * | 8/2005 | Crampton | G01B 11/03 33/503 |
| 2017/0176171 A1 | 6/2017 | Harsila et al. | |
| 2018/0156594 A1 | 6/2018 | Jansson | |
| 2020/0141714 A1 | 5/2020 | Cook et al. | |
| 2020/0141717 A1 | 5/2020 | Hamner et al. | |
| 2020/0386646 A1 | 12/2020 | Saito et al. | |
| 2021/0116228 A1 * | 4/2021 | Hamner | G01D 5/2046 |
| 2021/0117020 A1 * | 4/2021 | Hamner | G06F 3/04162 |
| 2022/0074728 A1 | 3/2022 | Hamner | |
| 2022/0205773 A1 | 6/2022 | Hamner et al. | |
| 2022/0205814 A1 | 6/2022 | Cook | |
| 2024/0175668 A1 * | 5/2024 | Freerksen | G01B 5/012 |

OTHER PUBLICATIONS

Extended European Search Report, mailed May 29, 2024, for European Patent Application No. 23219556.0. (8 pages).

* cited by examiner

MEASURING PROBE WITH FIELD GENERATING COIL CONFIGURATION AND TEMPERATURE COMPENSATION

BACKGROUND

Technical Field

This disclosure relates to precision metrology, and more particularly to measuring probes, such as are utilized by coordinate measuring machines.

Description of the Related Art

Coordinate measurement machines (CMM's) can obtain measurements of inspected workpieces. One exemplary prior art CMM described in U.S. Pat. No. 8,438,746, which is hereby incorporated herein by reference in its entirety, includes a probe for measuring a workpiece, a movement mechanism for moving the probe, and a controller for controlling the movement. A CMM including a surface measuring probe is described in U.S. Pat. No. 7,652,275, which is hereby incorporated herein by reference in its entirety. As disclosed therein, a mechanical contact probe or an optical probe may scan across the workpiece surface.

A CMM employing a mechanical contact probe is also described in U.S. Pat. No. 6,971,183, which is hereby incorporated herein by reference in its entirety. The probe disclosed therein includes a stylus having a probe tip (i.e., a surface contact portion), an axial motion mechanism, and a rotary motion mechanism. The axial motion mechanism includes a moving member that allows the probe tip to move in a central axis direction (also referred to as a Z direction or an axial direction) of the measuring probe. The rotary motion mechanism includes a rotating member that allows the probe tip to move perpendicular to the Z direction. The axial motion mechanism is nested inside the rotary motion mechanism. The probe tip location and/or workpiece surface coordinates are determined based on the displacement of the rotating member and the axial displacement of the axial motion moving member.

Inductive position detectors for stylus position measurements in CMM scanning probes (i.e., measuring probes) are disclosed in U.S. Pat. Nos. 10,866,080 and 10,914,570, each of which is hereby incorporated herein by reference in its entirety. The disclosed configurations include rotary sensing coils and respective axial sensing coil configurations. A stylus-coupled conductive disruptor moves along Z (axial) and X-Y (rotary) directions in a motion volume. A field generating coil generates a changing magnetic flux encompassing the disruptor and coils, and coil signals indicate the disruptor and/or stylus position.

In general, inductive sensing configurations in CMM probes may encounter various issues, such as signal/response non-linearities that are inherent in the displacement response of the system, position offsets and/or errors resulting from less than perfect assembly and alignment, signal drift due to environmental effects on mechanical and electrical components (e.g., due to temperature changes, etc.), signal noise, etc. Such issues may present particular challenges in such systems in which it is typically desirable to sense the smallest possible deflections of a probe tip from the smallest possible signal variations. These types of issues may present various challenges for achieving a desired range, amplification, signal-to-noise ratio, etc., for position signals from the probe. A need exists for improved circuitry configurations that can address such issues in CMM probes utilizing inductive type sensing configurations.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A measuring probe for a coordinate measuring machine is provided. The measuring probe includes a stylus suspension portion, a stylus position detection portion, a disruptor configuration, signal processing and control circuitry and a temperature dependent compensation portion. The stylus suspension portion includes a stylus coupling portion and a stylus motion mechanism. The stylus coupling portion is configured to be rigidly coupled to a stylus with a probe tip. The stylus motion mechanism is configured to enable axial motion of the stylus coupling portion along an axial direction, and rotary motion of the stylus coupling portion about a rotation center.

The stylus position detection portion is arranged along a central axis that is parallel to the axial direction and nominally aligned with the rotation center. The stylus position detection portion includes a field generating coil configuration and a sensing coil configuration. The field generating coil configuration comprises at least one field generating coil. The sensing coil configuration comprises top position sensing coils and at least one top normalization sensing coil (e.g., as part of a top sensing coil configuration), and bottom position sensing coils and at least one bottom normalization sensing coil (e.g., as part of a bottom sensing coil configuration). The top position sensing coils comprise at least one top axial sensing coil and at least four top rotary sensing coils. The bottom position sensing coils comprise at least one bottom axial sensing coil and at least four bottom rotary sensing coils.

The disruptor configuration comprises a conductive disruptor element that provides a disruptor area. The disruptor element is located along the central axis in a disruptor motion volume and the disruptor element is coupled to the stylus suspension portion. The disruptor element is configured to move in the disruptor motion volume relative to an undeflected position in response to a deflection of the stylus suspension portion. The field generating coil configuration is configured to generate a changing magnetic flux generally along the axial direction in the disruptor motion volume in response to a coil drive signal.

The signal processing and control circuitry is operably connected to the coils of the stylus position detection portion to provide the coil drive signal and is configured to receive signals comprising respective signal components provided by the respective sensing coils, and provide signals indicative of an axial position and a rotary position of the probe tip.

In various implementations, the temperature dependent compensation portion comprises a temperature dependent component, wherein the temperature dependent component is coupled to a field generating coil of the field generating coil configuration such that a change in a characteristic of the temperature dependent component due to an increase in temperature of the temperature dependent component causes relatively more current to flow through the field generating coil when driven by the coil drive signal than if the characteristic of the temperature dependent component had not changed.

In various implementations, the temperature dependent compensation portion comprises a temperature dependent component, wherein the temperature dependent component is coupled to at least part of the sensing coil configuration such that a change in a characteristic of the temperature dependent component due to an increase in temperature of the temperature dependent component causes a ratio of a first current to a second current to increase in the sensing coil configuration, wherein the first and second currents are in at least one first sensing coil and at least one second sensing coil, respectively, of the sensing coil configuration.

In various implementations, a method is provided for operating the measuring probe for a coordinate measuring machine, wherein the method includes: providing a coil drive signal to the field generating coil configuration to cause the at least one field generating coil to generate a changing magnetic flux, wherein a temperature dependent component of a temperature dependent compensation portion is coupled to a field generating coil of the field generating coil configuration such that a change in a characteristic of the temperature dependent component due to an increase in temperature of the temperature dependent component causes relatively more current to flow through the field generating coil when driven by the coil drive signal than if the characteristic of the temperature dependent component had not changed; and receiving signals from sensing coils of the sensing coil configuration. In various implementations, the method may further include providing signals that are indicative of a sensed position, as based at least in part on the received signals from the sensing coils of the sensing coil configuration.

In various implementations, a method is provided for operating a measuring probe for a coordinate measuring machine, wherein the method includes: providing a coil drive signal to the field generating coil configuration to cause the at least one field generating coil to generate a changing magnetic flux; and receiving signals from sensing coils of the sensing coil configuration, wherein a temperature dependent component of a temperature dependent compensation portion is coupled to at least part of the sensing coil configuration such that a change in a characteristic of the temperature dependent component due to an increase in temperature of the temperature dependent component causes a ratio of a first current to a second current to increase in the sensing coil configuration, wherein the first and second currents are in at least one first sensing coil and at least one second sensing coil, respectively, of the sensing coil configuration. In various implementations, the method may further include providing signals that are indicative of a sensed position, as based at least in part on the received signals from the sensing coils of the sensing coil configuration.

In various implementations, a system is provided including the measuring probe, a drive mechanism, and an attachment portion attaching the measuring probe to the drive mechanism. The drive mechanism is configured to move the measuring probe three dimensionally for moving the probe tip along a surface of a workpiece for measuring the workpiece.

DETAILED DESCRIPTION

Figure 1:
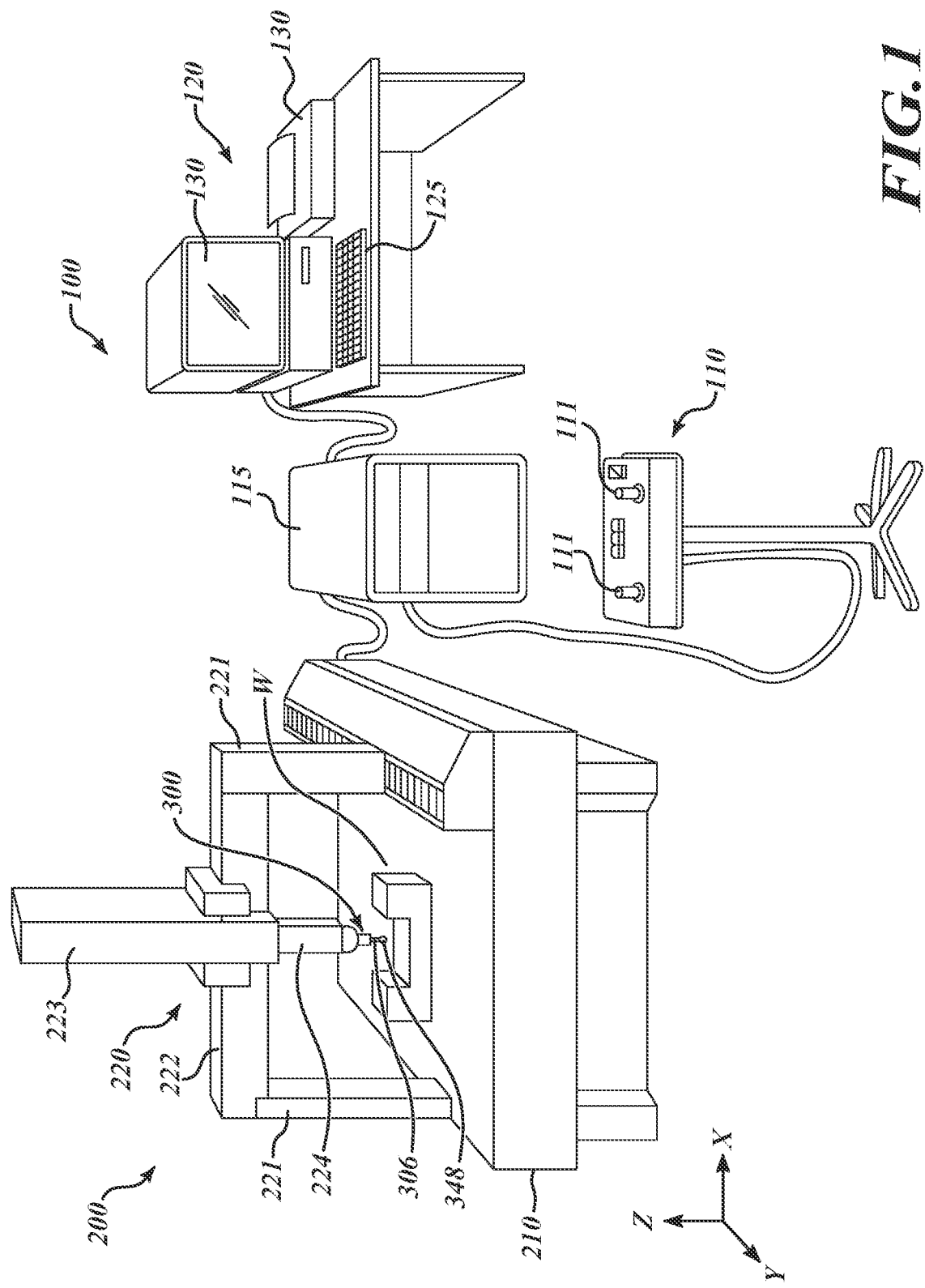
FIG. 1 is a diagram showing various typical components of a measuring system including a CMM utilizing a measuring probe such as that disclosed herein.

FIG. 1 is a diagram showing various typical components of a measuring system 100 including a CMM 200 utilizing a measuring probe 300 (e.g., a scanning probe) such as that disclosed herein. The measuring system 100 includes an operating unit 110, a motion controller 115 that controls movements of the CMM 200, a host computer 120, and the CMM 200. The operating unit 110 is coupled to the motion controller 115 and may include joysticks 111 for manually operating the CMM 200. The host computer 120 is coupled to the motion controller 115 and operates the CMM 200 and processes measurement data for a workpiece W. The host computer 120 includes input means 125 (e.g., a keyboard, etc.) for inputting, for example, measurement conditions, and output means 130 (e.g., a display, printer, etc.) for outputting, for example, measurement results.

The CMM 200 includes a drive mechanism 220 which is located on a surface plate 210, and a drive mechanism attachment portion 224 for attaching the measuring probe 300 to the drive mechanism 220. The drive mechanism 220 includes X axis, Y axis, and Z axis movement mechanisms 222, 221, and 223 (e.g., slide mechanisms), respectively, for moving the measuring probe 300 three-dimensionally. A stylus 306 attached to the end of the measuring probe 300 includes a probe tip 348 (e.g., which may also or alternatively be referenced as a contact portion 348). As will be described in more detail below, the stylus 306 is attached to a stylus suspension portion of the measuring probe 300, which allows the probe tip 348 to freely change its position in three directions when the probe tip 348 moves along a measurement path on the surface of the workpiece W.

Figure 2:
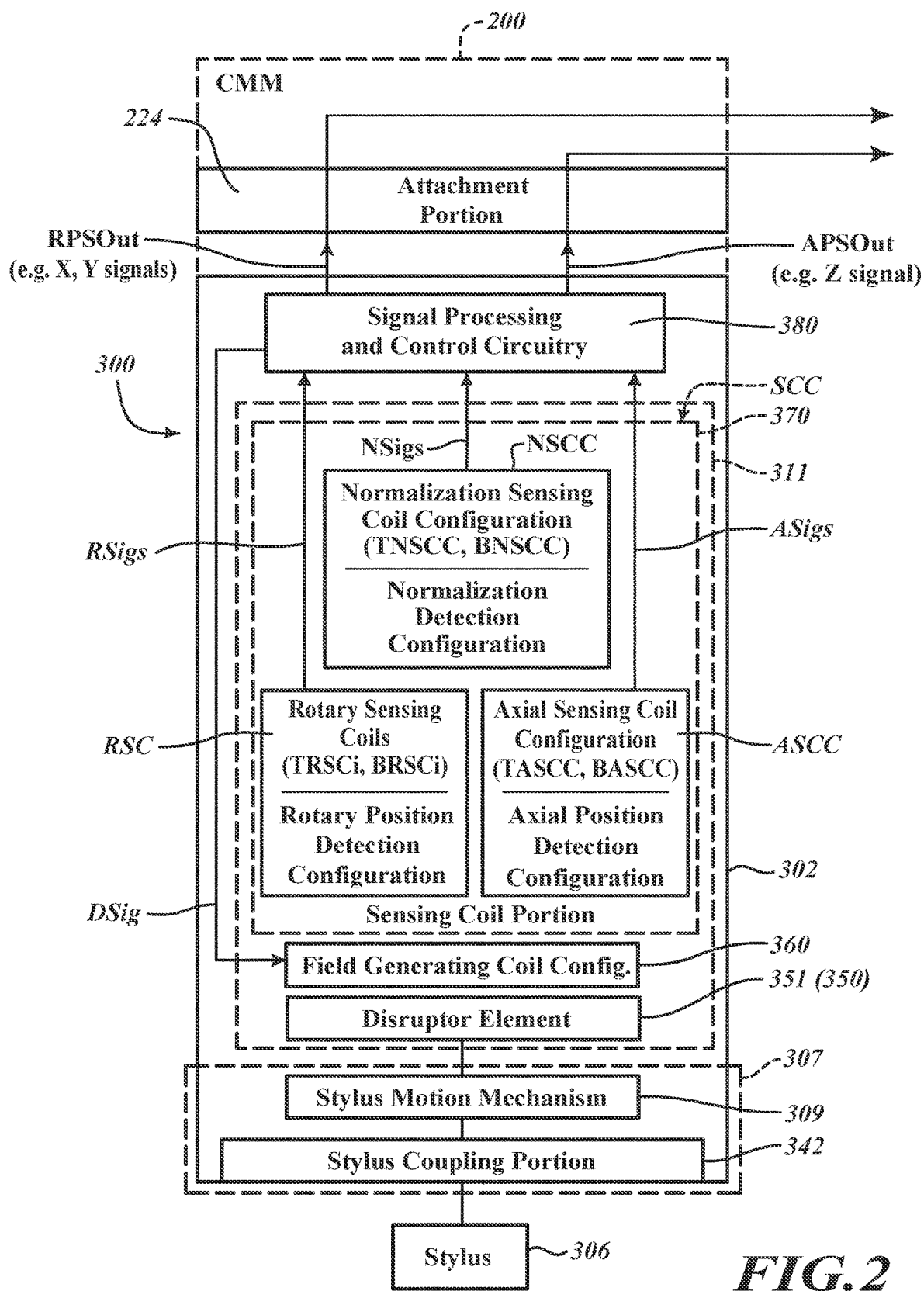
FIG. 2 is a block diagram showing various elements of a measuring probe as coupled to a CMM and providing rotary and axial position signals.

FIG. 2 is a block diagram showing various elements of a measuring probe 300 (e.g., a scanning probe) as coupled to a CMM 200 and providing rotary (e.g., X, Y) and axial (e.g., Z) position signals. The measuring probe 300 includes a probe main body 302 (e.g., comprising a frame) which incorporates a stylus suspension portion 307 and a stylus position detection portion 311. The stylus suspension portion 307 includes a stylus coupling portion 342 and a stylus motion mechanism 309. The stylus coupling portion 342 is rigidly coupled to a stylus 306. The stylus motion mechanism 309 is configured to enable axial motion of the stylus coupling portion 342 and attached stylus 306 along an axial direction, and to enable rotary motion of the stylus coupling portion 342 and attached stylus 306 about a rotation center, as will be described in more detail below with respect to FIGS. 3 and 4. Signal processing and control circuitry 380 included in the measuring probe 300 is connected to and governs the operation of the stylus position detection portion 311, and may perform related signal processing, all as described in greater detail below.

As shown in FIG. 2, the stylus position detection portion 311 uses inductive sensing principles and includes a sensing coil portion 370, a field generating coil configuration 360, and a disruptor element 351 (which may be part of a disruptor configuration 350, which may include a plurality of parts in some implementations). In various implementations, the disruptor configuration 350 with the disruptor element 351 may be part of the stylus position detection portion 311P, or may be a separate configuration and/or element.

The sensing coil portion 370 may comprise a rotary sensing coil portion (also referred to as rotary sensing coils) RSC and an axial sensing coil configuration ASCC. Briefly, the moving disruptor element 351 (or more generally, the disruptor configuration 350) causes position-dependent variations in a changing magnetic field generated by the field generating coil configuration 360. The sensing coil portion 370 is responsive to the changing magnetic field and the variations therein caused by the disruptor element 351. In particular, the rotary sensing coil portion RSC outputs at least first and second rotary signal components RSigs that are indicative of the rotary position (e.g., X and Y position signals) of the stylus coupling portion 342 over corresponding signal lines, the axial sensing coil configuration ASCC outputs one or more axial signal components ASigs that is indicative of the axial position (e.g., a Z position signal) of the stylus coupling portion 342 over corresponding signal lines, and a normalization sensing coil configuration NSCC outputs one or more normalization signal components NSigs (e.g., as indicative of the magnetic field as generated by the field generating coil configuration 360) over corresponding signal lines, as described in greater detail below with reference to FIGS. 3, 5 and 6, for example.

In various implementations, the signal processing and control circuitry 380 receives the rotary signal components RSigs, the axial signal components ASigs and the normalization signal components NSigs and may perform various levels of related signal processing in various implementations. For example, in one implementation, the signal processing and control circuitry 380 may cause the signal components from various sensing coils to be combined and/or processed in various relationships, and provide the results in a desired output format as the rotary and axial position signal outputs RPSOut and APSOut, through the attachment portion 224. One or more receiving portions (e.g., in the CMM 200, motion controller 115, host computer 120, etc.) may receive the rotary and axial position signal outputs RPSOut and APSOut, and one or more associated processing and control portions may be utilized to determine a three-dimensional position of the stylus coupling portion 342 and/or of the probe tip 348 of the attached stylus 306 as the probe tip 348 moves along a surface of a workpiece W for measuring the workpiece.

As indicated above, in various implementations, the normalization sensing coil configuration NSCC (e.g., as including top and bottom normalization sensing coil configurations TNSCC and BNSCC) may also be included in the sensing coil portion 370. In various implementations, the top and bottom normalization sensing coil configurations TNSCC and BNSCC may be utilized to provide a measurement of the generated magnetic field (e.g., corresponding to the changing magnetic flux that is generated by the field generating coil configuration 360), for which the measured signal may be relatively independent of (e.g., may be only nominally affected by) the position of the disruptor element 351. In various implementations, the position measurements (e.g., the signals from the rotary and axial sensing coils) may be scaled to this measured signal to make them relatively insensitive to variations in the amplitude of the generated field (as generated by the field generating coil configuration 360). In various implementations, such processing may be performed by signal processing and control circuitry 380 (e.g., the signal processing and control circuitry 380). In various implementations, the sensing coil portion 370 may be designated as including a sensing coil configuration SCC (e.g., as including the sensing coils of the rotary sensing coil portion RSC, the axial sensing coil configuration ASCC and the normalization sensing coil configuration NSCC).

Figure 3:
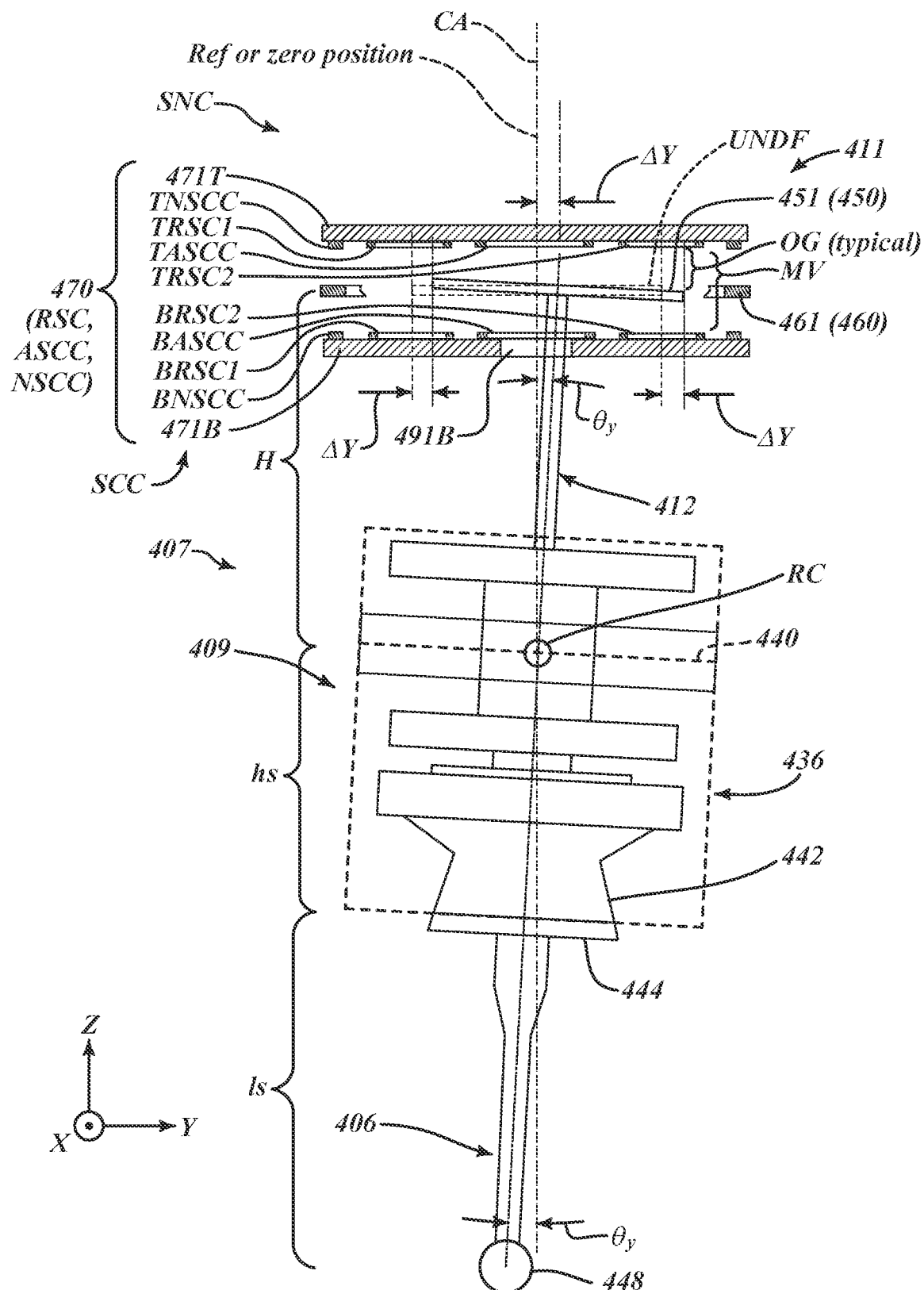
FIG. 3 is a diagram showing portions of a first exemplary implementation of a stylus suspension portion as coupled to a stylus and a first exemplary implementation of a stylus position detection portion for detecting the position of the stylus suspension portion.

FIG. 3 is partially schematic diagram showing portions of a first exemplary implementation of a schematically represented stylus suspension portion 407 as coupled to a stylus 406, along with a partially schematic cross-section of a first exemplary implementation of a stylus position detection portion 411 for detecting the position of the stylus suspension portion 407 and/or the stylus 406. It will be appreciated that certain numbered components 4XX of FIG. 3 may correspond to and/or have similar operations as similarly numbered counterpart components 3XX of FIG. 2, and may be understood by analogy thereto and as otherwise described below. This numbering scheme to indicate elements having analogous design and/or function is also applied to the other figures as discussed herein. As shown in FIG. 3, the stylus suspension portion 407 includes a stylus motion mechanism 409 and a stylus coupling portion 442. The stylus coupling portion 442 is configured to be rigidly coupled to a stylus 406 which has a probe tip 448 for contacting a surface S of a workpiece W (e.g., see FIG. 1).

As will be described in more detail below with respect to FIG. 4, the stylus motion mechanism 409 (e.g., which may be coupled either directly or indirectly to a frame of the measuring probe) is configured to enable axial and rotary motion of the stylus coupling portion 442 and attached stylus 406 so that the probe tip 448 can change its position in three directions along the shape of the surface of the workpiece W. For purposes of illustration, the vertical and horizontal directions on the plane of paper in FIG. 3 are defined as Z and Y directions, respectively, and the perpendicular direction to the plane of the paper is defined as the X direction. The direction of a central axis CA, also referred to as the axial direction, of the measuring probe 300 coincides with the Z direction in this illustration.

In FIG. 3, rotary motion portions of the stylus motion mechanism 409 are represented, including a rotating member 436, a flexure element 440, and a moving member 412 disposed within the rotating member 436. As will be described in more detail below with respect to FIG. 4, the flexure element 440 enables rotary motion of the rotating member 436 about a rotation center RC. As will be described in more detail below, in various implementations rotary sensing coils TRSCi and BRSCi (where i is an index integer which identifies specific coils) and stylus position detection portion 411 are able to sense the rotated position of the disruptor element 451 and thereby the rotated position of the moving member 412 (e.g., in X and Y directions), and the axial sensing coil configurations TASCC and BASCC (also referred to as the axial sensing coils) are able to sense the axial position of the disruptor element 451 and thereby the axial position of the moving member 412 (e.g., in the Z direction).

As shown in FIG. 3, a disruptor element 451 (or more generally a disruptor configuration 450) is coupled to the moving member 412 and moves relative to the measuring probe frame (e.g., wherein the frame is included as part of the measuring probe main body, etc.), within a disruptor motion volume MV located between the top and bottom coil substrates 471T and 471B, respectively. As shown in FIG. 3, the moving member 412 extends through and moves in a hole 491B located along the central axis CA in a bottom coil substrate 471B. The attached disruptor element 451 moves in the disruptor motion volume MV relative to an undeflected position UNDF (e.g., which may also correspond to a zero or reference position) in response to a deflection of the stylus suspension portion 407 and the moving member 412.

In the implementation shown in FIG. 3, the field generating coil configuration 460 comprises a single planar field generating coil 461 that is located approximately at a midplane of the disruptor motion volume MV and that is nominally planar and orthogonal to the central axis CA. As previously outlined with reference to FIG. 2, the sensing coil portion 470 may generally comprise a rotary sensing coil portion (also referred to as rotary sensing coils) RSC, an axial sensing coil configuration ASCC and a normalization sensing coil configuration NSCC. The rotary position detection configuration RSC generally includes top rotary sensing coils TRSCi and bottom rotary sensing coils BRSCi. A sensing coil configuration SCC may include the sensing coils of the sensing coil portion 470.

In the example of FIG. 3, the planar top coil substrate 471T includes N top rotary sensing coils TRSC (e.g., TRSC1-TRSC4, where N=4, in evenly spaced positions around the central axis CA), a top axial sensing coil configuration TASCC (e.g., comprising a single individual coil in this implementation), and a top normalization sensing coil configuration TNSCC (e.g., comprising a single individual coil in this implementation). The planar bottom coil substrate 471B includes N bottom rotary sensing coils BRSC (e.g., BRSC1-BRSC4, where N=4, in evenly spaced positions around the central axis CA), a bottom axial sensing coil configuration BASCC (e.g., comprising the single individual coil in this implementation) and a bottom normalization sensing coil configuration TNSCC (e.g., comprising a single individual coil in this implementation). The top and bottom coil substrates 471T and 471B may be nominally parallel to one another and nominally orthogonal to the central axis CA, and are spaced apart along the central axis CA with at least part of a disruptor motion volume located therebetween. It should be appreciated that although the various sensing coils shown in FIGS. 3 and 4 may in some instances be represented by "closed loops" for simplicity of illustration, all coils comprise windings or conductors that have first and second connection ends that are configured to operate as one or more inductively coupled "turns" (e.g., comprising "loops" which may not be closed) and be coupled to associated circuitry (e.g., the circuitry of the signal processing and control circuitry module 480).

In the cross section shown in FIG. 3, only two top rotary sensing coils TRSC1 and TRSC2, and two bottom rotary sensing coils BRSC1 and BRSC2, are visible. These rotary sensing coils may provide signal components indicative of the position of the disruptor element 451 along the Y direction. In particular, their signal components vary depending on an amount of displacement ΔY of the disruptor element 451 along the Y direction, and are therefore indicative of the amount of displacement ΔY. The displacement ΔY determines an associated amount of "overlap" between the disruptor element 451 and the various rotary sensing coils TRSCi and BRSCi, and thereby their amount of coupling to the changing magnetic field generated by the field generating coil 461 (which determines the resultant signal components). Other rotary sensing coils (e.g., top rotary sensing coils TRSC3 and TRSC4, and bottom rotary sensing coils BRSC3 and BRSC4) provide signal components which are similarly indicative of the position of the disruptor element 451 along the X axis direction. The rotary sensing coils TRSC3, TRSC4, BRSC3 and BRSC4 would be visible in a view rotated by 90 degrees around the central axis CA relative to the view of FIG. 3 (e.g., and in the rotated view would be in similar locations as those currently shown in FIG. 3 for the rotary sensing coils TRSC1, TRSC2, BRSC1 and BRSC2, respectively).

The axial sensing coil configuration ASCC includes the top axial sensing coil configuration TASCC and the bottom axial sensing coil configuration BASCC. In the implementation shown in FIG. 3, the top axial sensing coil configuration TASCC comprises a single top axial sensing coil that at least partially surrounds the central axis CA, and the bottom axial sensing coil configuration BASCC comprises a single bottom axial sensing coil that at least partially surrounds the central axis CA, as shown. In various implementations, these axial sensing coils may be always completely "overlapped" by the disruptor element 451. Therefore, their signal components may be nominally only responsive to the position of the disruptor element 451 along the axial or Z direction, and correspondingly indicative of the position of the disruptor element 451 along the Z direction.

The normalization sensing coil configuration NSCC includes the top normalization sensing coil configuration TNSCC and the bottom normalization sensing coil configuration BNSCC. In the implementation shown in FIG. 3, the top normalization sensing coil configuration TNSCC comprises a single top normalization sensing coil that at least partially surrounds the central axis CA, and the bottom normalization sensing coil configuration BNSCC comprises a single bottom normalization sensing coil that at least partially surrounds the central axis CA, as shown.

Similar to operations previously outlined with reference to FIG. 2, in operation the moving disruptor element 451 causes position-dependent local variations in a changing magnetic field along the axial direction generated by the field generating coil 461. The sensing coil portion 470 is responsive to the changing magnetic field and the variations therein caused by the disruptor element 451, and outputs the rotary signal components RSigs and the axial signal components ASigs that may be processed to determine the rotary position of the disruptor element 451 (e.g., a Y and X position, and corresponding signals) and its axial position (e.g., a Z position), as previously outlined with reference to FIG. 2, and as described in further detail below. It will be appreciated that the position of the disruptor element 451 is related by a known geometry to the position of the stylus coupling portion 442 and/or its probe tip 448, such that signals/positions that are indicative of one of the positions are also indicative of the other positions. For example, for small rotation angles, for the illustrated movement or displacement ΔY of the disruptor element 451 along the Y direction away from null (e.g., from the undeflected position UNDF):

$$\Delta Y = H\theta_Y \quad (\text{Eq. 1})$$

where H is the distance from the rotation center RC to the nominal plane of the disruptor element 451, and $\theta_Y$ is the rotary motion tilt of the rotating member 436 (and the moving member 412) in a plane parallel to the Y direction (i.e., that is, rotation about an axis parallel to the X axis at the rotation center RC). If a larger rotation angle is used in various implementations, an analogous expression that is accurate for larger rotation angles may be used, as is known in the art. The Y direction movement or displacement $Y_{STYLUS}$ away from null (e.g., corresponding to the undeflected position UNDF) of the probe tip 448 of the stylus 406 in relation to the rotary motion tilt component $\theta_Y$ may be approximated as:

$$\Delta Y_{STYLUS} = \theta_Y^*(h_S + l_S) \quad (\text{Eq. 2})$$

where $h_S$ is the distance from the end of the stylus coupling portion 442 to the rotation center RC, and $I_S$ is the length of the stylus 406. Combining EQUATIONS 1 and 2, the ratio of the displacement ΔY of the disruptor element 451 in relation to the Y direction displacement at the probe tip 448 may be approximated as:

$$\Delta Y/\Delta Y_{STYLUS} = H/(h_S + l_S) \quad (\text{Eq. 3})$$

It will be appreciated that the X coordinate motion components are analogous to the above expressions, and will not be explained in further detail herein. The stylus length $I_S$ for various styli may be utilized in the equations (e.g., with respect to the trigonometry of the system) for determining the X-Y position of the probe tip 448 based on the signals from the rotary sensing coils RSC (i.e., as indicating the X-Y position of the disruptor element 451). Regarding the Z coordinate displacement or position component, a displacement ΔZ (not shown) of the disruptor element 451 along the axial or Z direction away from null (e.g., corresponding to the undeflected position UNDF), in relation to the Z direction displacement $\Delta Z_{STYLUS}$ at a stylus contact portion (e.g., the probe tip 448) may be approximated as:

$$\Delta Z/\Delta Z_{STYLUS} \approx 1 \quad (\text{Eq. 4})$$

Figure 4:
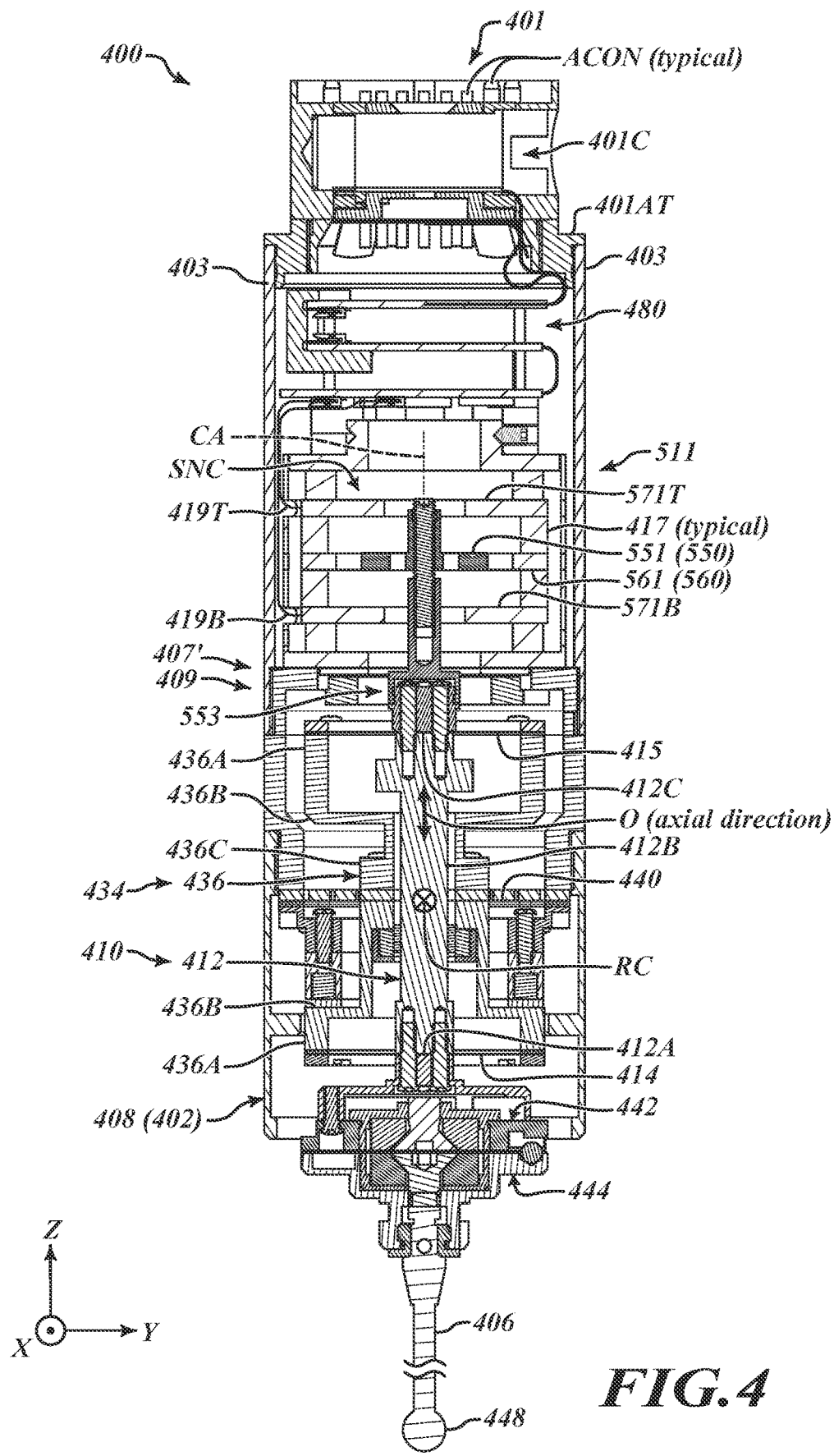
FIG. 4 is a diagram showing a cross section of one implementation of the stylus suspension portion of FIG. 3 as included within a main body frame of a measuring probe.

FIG. 4 is a partially schematic diagram showing a cross section of one implementation of a stylus suspension portion 407' usable as the stylus suspension portion 407 represented in FIG. 3, as well as one implementation of a stylus position detection portion 511 that is similar to the stylus position detection portion 411 shown in FIG. 3, and signal processing and control circuitry 480. The foregoing elements are shown as included within a frame 408 of a probe main body 402 of a measuring probe 400. In various implementations, the probe cover 403 may be cylindrical, and is configured to surround the stylus suspension module 407' and the stylus position detection module 511 (e.g., surrounding radially in directions perpendicular to the central axis CA) when the measuring probe 400 is assembled.

The substrates 571T, 571B, and the field generating coil 561 or its substrate (e.g., printed circuit type substrates) of a sensor configuration SNC of the stylus position detection portion 511 may be positioned for proper operation in the measuring probe 400 using alignment and mounting portions 417, or other known techniques. Various signal connections associated with the stylus position detection portion 511 may be provided by electrical connectors 419 (e.g., 419B and 419T; flex print and/or wire connections), or the like, according to known techniques. In some implementations, some or all of the signal processing and control circuitry 480 may be provided as a separate circuit assembly as represented in FIG. 4. In other implementations, some or all of the signal processing and control circuitry 480 may be combined on the substrates of the stylus position detection portion 511, if desired.

As shown in FIG. 4, the stylus suspension portion 407' includes a stylus motion mechanism 409 and a stylus coupling portion 442 which is coupled to a stylus 406. The stylus motion mechanism 409 may include a moving member 412, a rotating member 436, a flexure element 440 coupled to the main body frame 408 for supporting and enabling rotary motion of the rotating member 436, and flexure elements 414 and 415 (i.e., referenced as first flexure elements) supporting the moving member 412 and coupling it to the rotating member 436 for enabling axial motion of the moving member 412. The measuring probe 400 includes the stylus position detection portion 511 having components and operation described in greater detail below with reference to FIG. 5, for determining the position and/or motion of the stylus motion mechanism 409 and/or the probe tip 448 of the stylus 406.

The flexure element 440 (i.e., referenced as a second flexure element) may be disposed between the respective planes of a pair of flexure elements 414 and 415 (i.e., referenced as first flexure elements) in the axial direction O. Flexure designs suitable for the flexure elements 414, 415 and 440 may be determined according to principles known in the art. For example, one possible implementation is illustrated in U.S. Pat. No. 9,791,262, which is hereby incorporated herein by reference in its entirety. The rotating member 436 may have a shape symmetric about the second flexure element 440 and may integrally include: two ring portions 436A; two connecting portions 436B; and a cylindrical portion 436C. Peripheral portions of the first flexure elements 414 and 415 are fixed to the ring portions 436A. The connecting portions 436B extend inside of the ring portions 436A so as to connect to the cylindrical portion 436C, which has a hollow center. The first flexure elements 414 and 415 may be disposed at a symmetric distance with respect to the second flexure element 440, although it will be appreciated that such an implementation is exemplary only and not limiting.

An axial motion mechanism 410 including the moving member 412 is supported inside of the rotating member 436, and the rotating member 436 and the axial motion mechanism 410 together constitute a motion module that is part of the stylus motion mechanism 409. The axial motion mechanism 410 allows the probe tip 448 to move in the axial direction O. The rotary motion mechanism 434 including the rotating member 436 allows the probe tip 448 of the stylus 406 to move transverse (e.g., approximately perpendicular) to the axial direction O by means of rotary motion about the rotation center RC.

The moving member 412 integrally includes: a lower portion 412A; a rod portion 412B; and an upper portion 412C. As previously outlined with reference to FIG. 3, and as described in more detail below with respect to the stylus position detection portion 511 shown in FIG. 5, the disruptor element 551 that is attached to the upper portion 412C of the moving member 412 functions as both a rotary and axial position indicating element. The rod portion 412B is disposed between the pair of first flexure elements 414 and 415. The rod portion 412B is housed in the rotating member 436. The lower portion 412A is formed below the rod portion 412B and a stylus coupling portion 442 (e.g., a flange member) is attached to the lower portion 412A. A flange part 444 is provided for attachment of the stylus 406. The flange part 444 and the stylus coupling portion 442 together may constitute a detachable coupling mechanism (e.g., a known type of kinematic joint or coupling) which allows attachment and detachment between various styli 406 and the stylus coupling portion 442 with repeatable positioning (e.g., in the case of a collision knocking off a stylus, or when intentionally changing styli, etc.)

The measuring probe 400 includes an autojoint connection portion 401 (e.g., for attaching to an attachment portion of a CMM, such as the drive mechanism attachment portion 224 of the CMM 200 of FIG. 1). In various implementations, the autojoint connection portion 401 may comprise precise kinematic mounting features and electrical connections that provide a physical interface that is common to various interchangeable CMM probes or sensors, according to known principles. An exemplary known technique and mechanism usable for automatic exchange of a CMM probe to and from a kinematic mounting at an autojoint is described in U.S. Pat. No. 4,651,405, which is hereby incorporated herein by reference in its entirety. In various implementations, the autojoint connection portion 401 may include autojoint connecting elements ACON (e.g., electrical connecting elements, etc.), which may connect to or though components in an autojoint components portion 401C.

Figure 5:
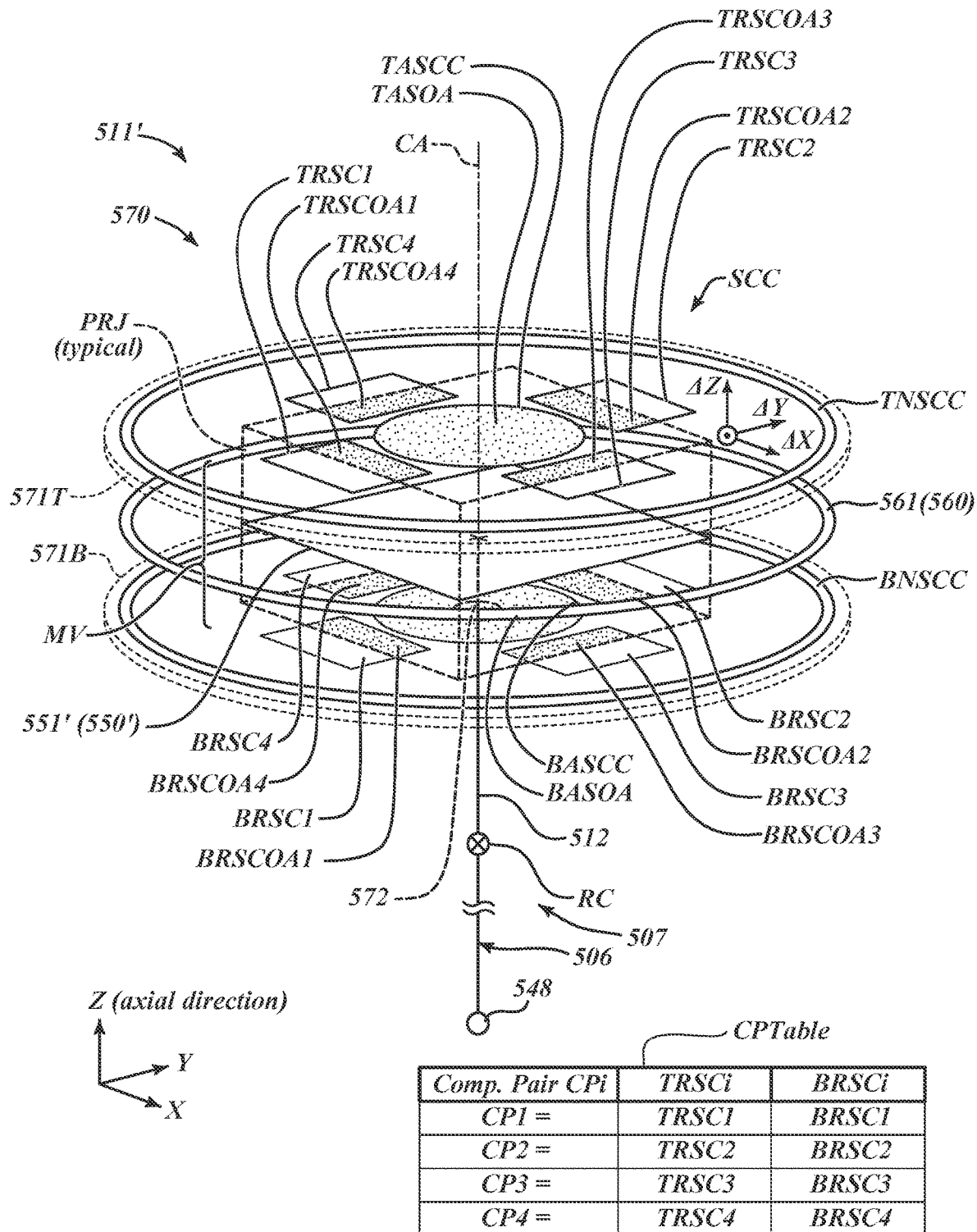
FIG. 5 is a partially schematic isometric diagram of an alternative implementation of the stylus position detection portion shown in FIGS. 3 and 4.

FIG. 5 is a partially schematic isometric diagram of an implementation of a stylus position detection portion 511' that is similar to a stylus position detection portion 511 shown in FIG. 4, emphasizing certain aspects. In various implementations, the stylus position detection portions 511' and 511 may be similar except for certain differences (e.g., a difference in the field generating coil configuration 560, etc.), as explained further below. In general, the stylus position detection portion 511' includes certain components that are similar to those of the stylus position detection portions 311, 411 and 511 of FIGS. 2, 3 and 4, and will be understood to operate similarly except as otherwise described below.

Figure 6:
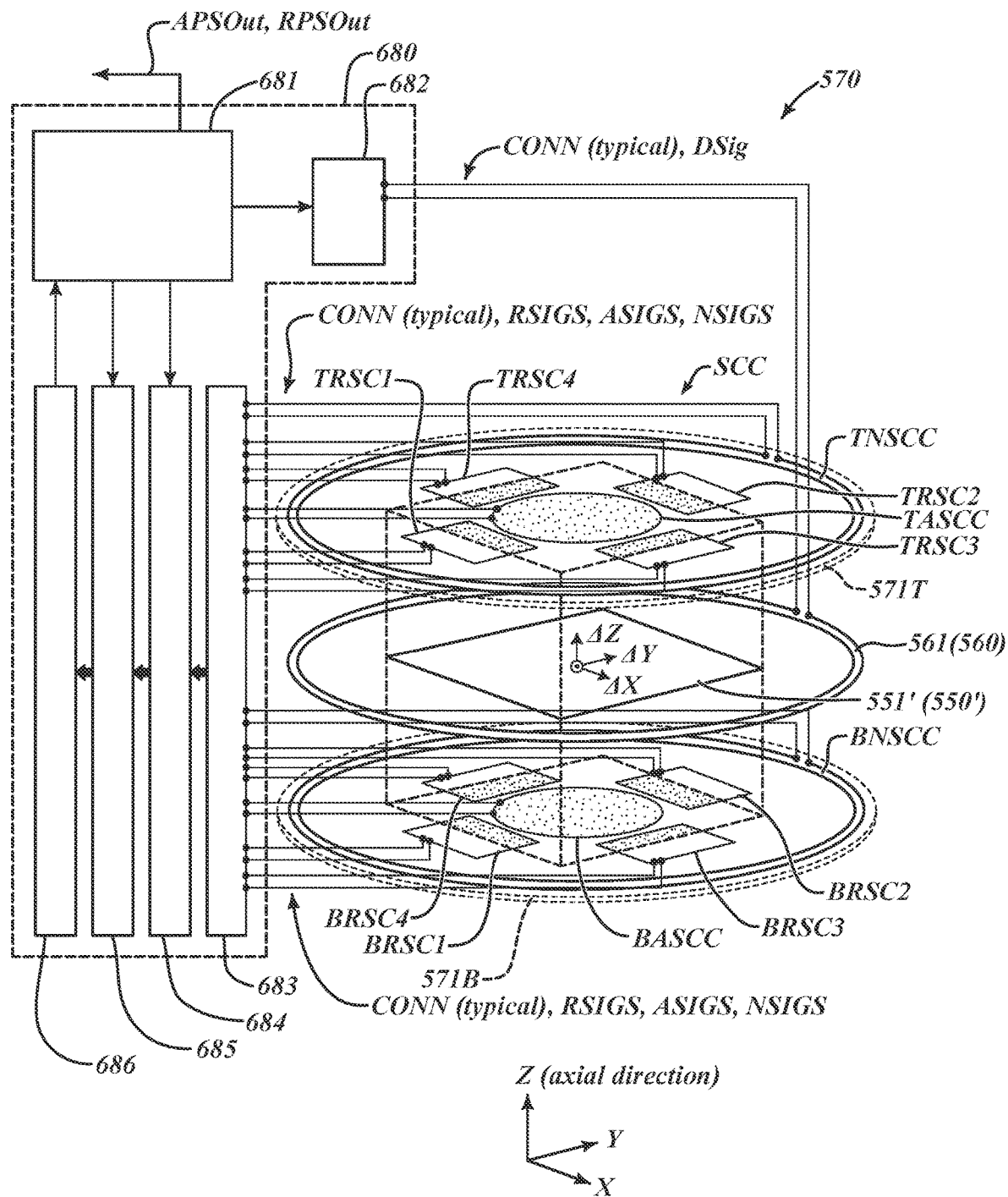
FIG. 6 is a partially schematic isometric diagram of certain elements of the stylus position detection portion shown in FIG. 5.

In the implementation shown in FIG. 5, the stylus position detection portion 511' comprises the sensing coil portion 570, the disruptor configuration 550' comprising the disruptor element 551', and the field generating coil configuration 560. In various implementations, disruptor element 551' (or more generally the disruptor configuration 550') may comprise a conductive plate or conductive loop, or parallel conductive plates or conductive loops (e.g., as fabricated on two sides of a printed circuit substrate, patterned by printed circuit board fabrication techniques), or any other desired operational configuration that provides a disruptor area (e.g., its interior area). In the examples of FIGS. 5 and 6, the disruptor element 551' is generally represented as a conductive plate with a square shape. In other implementations (e.g., in the example of FIG. 4), the disruptor element (e.g., disruptor element 551) may be a conductive element with a different shape (e.g., may have a circular shape). In general, it will be appreciated that disruptor elements with different shapes may be utilized in different implementations in accordance with the principles disclosed herein.

In regard to the example of FIG. 5, the disruptor element 551' is located along the central axis CA in the disruptor motion volume MV between the top and bottom coil substrates 571T and 571B and is coupled to the stylus suspension portion 507 by a disruptor coupling configuration 553 (e.g., comprising the moving member 512). For purposes of explanation, the disruptor element 551' may be described as moving relative to the undeflected position illustrated in FIG. 5 (see the undeflected position UNDF, in FIG. 3) in response to a deflection of the stylus suspension portion 507 and/or the stylus 506 and/or the moving member 512. The disruptor element may be described as moving with displacement increments ΔZ over an operating motion range +/−Rz along the axial direction in response to axial motion, and with displacement increments ΔX and ΔY over respective operating motion ranges +/−Rx and +/−Ry along orthogonal X and Y directions that are orthogonal to the axial direction (Z direction) in response to rotary motion.

The sensing coil portion 570 may comprise the planar top coil substrate 571T including N top rotary sensing coils TRSC (e.g., TRSC1-TRSC4, where N=4), a top axial sensing coil configuration TASCC (e.g., comprising the single illustrated individual coil in this implementation), and a top normalization sensing coil configuration TNSCC (e.g., comprising the single illustrated individual coil in this implementation), and a planar bottom coil substrate 571B including N bottom rotary sensing coils BRSC (e.g., BRSC1-BRSC4, where N=4), a bottom axial sensing coil configuration BASCC (e.g., comprising the single illustrated individual coil in this implementation), and a bottom normalization sensing coil configuration BNSCC (e.g., comprising the single illustrated individual coil in this implementation). A sensing coil configuration SCC may include the sensing coils of the sensing coil portion 570. The top and bottom coil substrates 571T and 571B are mounted in a fixed relationship with the bottom coil substrate closer to the stylus 506 and/or the stylus suspension portion 507. The top and bottom coil substrates 571T and 571B may be nominally parallel to one another and nominally orthogonal to the central axis CA, and are spaced apart along the central axis CA (e.g., with the disruptor motion volume MV located at least partially therebetween). It should be appreciated that although the various sensing coils shown in FIG. 5 are represented by "closed loops" for simplicity of illustration, all coils comprise windings or conductors that have first and second connection ends (e.g., as at least partially represented in FIG. 6) that are configured to operate as one or more inductively coupled "turns" (e.g., including "loops" which may not be closed).

The field generating coil configuration (e.g., the field generating coil configuration 560) generally comprises at least a first field generating coil that is located proximate to the disruptor motion volume MV and that is nominally planar and orthogonal to the central axis CA. Similar to the single planar field generating coil 461 in the implementation shown in FIG. 3 (which is located approximately at a midplane of the disruptor motion volume MV), in the implementation shown in FIG. 5, the field generating coil configuration 560 comprises a similar single planar field generating coil 561. In certain alternative implementations, a field generating coil configuration may include a pair of planar field generating coils (e.g., located on or proximate to the top and bottom coil substrates 571T and 571B, respectively) that is approximately equidistant from a midplane of the disruptor motion volume MV along the central axis CA, and that are nominally planar and orthogonal to the central axis CA. Generally speaking, the field generating coil configurations 460 and 560, or such alternative field generating coil configurations, may be used with the sensing coil portion 570. In certain implementations, it may be desirable that the field generating coil configuration comprises at least a first field generating coil that is configured such that a projection of its coil area along the axial direction (Z direction) encompasses the conductive plate or loop that provides the disruptor area of the disruptor configuration 550 (e.g., of the disruptor element 551') and a coil area of all the rotary and axial sensing coils RSCi and ASCC located on the top and bottom coil substrates 571T and 571B. In general, the field generating coil configuration is configured to generate a changing magnetic flux generally along the axial direction in the disruptor motion volume MV in response to a coil drive signal, as desired for operation of the stylus position detection portion 511'. It should be appreciated that, although the field generating coil shown in FIG. 5 is represented by a "closed loop" (e.g., comprising one or more conductive traces, the edges of which are shown) for simplicity of illustration, in an actual device all coils comprise windings or conductors that have first and second connection ends (e.g., as at least partially represented in FIG. 6), and are configured to operate as one or more field generating "turns" (e.g., including "loops" which may not be closed).

As illustrated in FIG. 5, a projection of the disruptor element 551' along the axial direction (e.g., as shown by fine dashed lines PRJ in FIG. 5) through an interior coil area of the top axial sensing coil configuration TASCC defines a top axial sensing overlap area TASOA (indicated by a dot pattern filling that interior coil area), and a projection of the disruptor element 551' along the axial direction through an interior coil area of the bottom axial sensing coil configuration BASCC defines a bottom axial sensing overlap area BASOA (indicated by a dot pattern filling that interior coil area). Similarly, a projection of the disruptor element 551' along the axial direction through an interior coil area of any respective top rotary sensing coil TRSCi (e.g., TRSC1-TRSC4) defines a respective top rotary coil sensing overlap area TRSCOAi (e.g., TRSCOA1-TRSCOA4), as indicated by a dot pattern filling the various respective overlap areas shown in FIG. 5, where i is an individual coil identification index in the range 1 to N. A projection of the disruptor element 551' along the axial direction through an interior coil area of any respective bottom rotary sensing coil BRSCi (e.g., BRSC1-BRSC4) defines a respective bottom rotary coil sensing overlap area BRSCOAi (e.g., TRSCOA1-TRSCOA4), as indicated by a dot pattern filling the various respective overlap areas shown in FIG. 5.

Regarding axial position detection in a stylus position detection portion (e.g., 511'), the sensing coil portion (e.g., 570) and the disruptor element (e.g., 551') are generally configured to provide a top axial sensing overlap area TASOA and bottom axial sensing overlap area BASOA wherein an amount of each of the overlap areas TASOA and BASOA is unchanged or independent of the position of the disruptor element 551' within operating motion ranges +/−Rz, +/−Rx, and +/−Ry. It will be appreciated that, for a particular measuring probe, the operating motion ranges may be prescribed or specified in combination with the configuration of the probe's particular stylus position detection portion, if needed, in order to fulfill this requirement. In this way, the signal components generated in the top and bottom axial sensing coil configurations TASCC and BASCC are nominally independent of the rotary motion (that is the position of the disruptor element 551' along the X and Y directions), and are nominally sensitive only to variations in "proximity" or gap to the disruptor element 551', which varies depending on the axial (Z) position or displacement ΔZ of the disruptor element 551'. In operation, currents induced in the disruptor element 551' by the changing magnetic field of the field generating configuration 560 cause opposing magnetic fields. Generally speaking, as the disruptor element 551' moves upward along the axial (Z) direction in FIG. 5, the opposing magnetic fields couple more strongly to the top axial sensing coil configuration TASCC, reducing its signal component that arises from the changing magnetic field. Conversely, the opposing magnetic fields couple more weakly to the bottom axial sensing coil configuration BASCC, increasing its signal component that arises from the changing magnetic field. By a convention used in this disclosure, we may refer to a signal component SIGTASCC as the signal component arising from a particular top axial sensing coil configuration (or coil) TASCC, and so on.

It will be appreciated that at the undeflected position UNDF, the net signal components SIGTASCC and SIGBASCC may be approximately balanced. For small displacements ΔZ, such as those expected in operation, the net signal components SIGTASCC and SIGBASCC may vary approximately linearly, and inversely compared to one another. In one implementation, an axial displacement or position ΔZ may be indicated by, or correspond to, the signal relationship:

ΔZ=function of [(SIGBASCC−SIGTASCC)/(SIGTN-SCC+SIGBNSCC)]   (Eq. 5)

This signal relationship is exemplary only, and not limiting. In various implementations, this signal relationship may be adjusted or compensated by additional calibration or signal processing operations, including operations that reduce the effects of geometric and/or signal cross-coupling between various displacement directions or signal components, if desired. In various implementations, the top axial sensing coil configuration may comprise at least one top axial sensing coil that is not one of the N top rotary sensing coils and that is arranged closer to the central axis than the top rotary sensing coils, and the at least one top axial sensing coil and the disruptor element are characterized in that the at least one top axial sensing coil has an interior coil area that is smaller than the disruptor element, and a projection of the disruptor element along the axial direction completely fills the interior coil area of the at least one top axial sensing coil for any position of the disruptor element within the operating motion ranges +/−Rz, +/−Rx, and +/−Ry, whereby the top axial sensing overlap area TASOA is unchanged by the position of the disruptor element. Similarly, in various such implementations, the bottom axial sensing coil configuration may comprise at least one bottom axial sensing coil that is not one of the N bottom rotary sensing coils and that is arranged closer to the central axis than the bottom rotary sensing coils, and the at least one bottom axial sensing coil and the disruptor element are characterized in that the at least one bottom axial sensing coil has an interior coil area that is smaller than the disruptor element and a projection of the disruptor element along the axial direction completely fills the interior coil area of the at least one bottom axial sensing coil for any position of the disruptor element within the operating motion ranges +/−Rz, +/−Rx, and +/−Ry, whereby the bottom axial sensing overlap area TASOA is unchanged by the position of the disruptor element. It may be seen that the particular implementation of the stylus position detection portion 511' shown in FIG. 5, wherein the top axial sensing coil configuration TASCC and the bottom axial sensing coil configuration BASCC each comprise a single sensing coil, conforms to this description. It will be appreciated that various configurations of the top and bottom axial sensing coil configurations TASCC and BASCC may be used, and the particular configurations shown in FIG. 5 are exemplary only and not limiting.

Regarding rotary position detection in a stylus position detection portion (e.g., 511'), the sensing coil portion (e.g., 570) and the disruptor element (e.g., 551') are generally configured to provide N complementary pairs of rotary sensing coils CPi (e.g., CP1-CP4, where N=4) that each comprise a top rotary sensing coil TRSCi and a bottom rotary sensing coil BRSCi, wherein for any complementary pair CPi, and for any disruptor element displacement increment within the operating motion ranges +/−Rz, +/−Rx, and +/−Ry, the magnitude of the change in overlap areas TRSCOAi and BRSCOAi associated with that disruptor displacement increment is nominally the same in that complementary pair. It will be appreciated that for a particular measuring probe the operating motion ranges may be prescribed or specified in combination with the configuration of its particular stylus position detection portion, if needed in order to fulfill this requirement. The table CPTable in FIG. 5 indicates the respective members TRSCi and BRSCi of each respective complementary pair CPi for the implementation shown in FIG. 5.

By conforming to the foregoing principle, the complementary pairs CPi shown in FIG. 5 may be used to compensate or eliminate certain cross-coupling errors, and/or to simplify the signal processing required to provide precise rotary position or displacement measurements (e.g., along the X and/or Y directions). In particular, pairs of signal components arising in complementary pairs CPi of rotary sensing coils in the implementation shown in FIG. 5 may be combined or processed in a relationship that provides a resulting output signal that is nominally insensitive to variations in "proximity" or gap between the individual coils of the complementary pair and the disruptor element 551'. That is, the resulting output signal may be insensitive to the axial (Z) position or displacement ΔZ of the disruptor element 551', and nominally only sensitive to a rotary position or displacement (e.g., along the X and/or Y directions). For the particular implementation shown in FIG. 5, it may be understood that a displacement of the disruptor element 551' that has a displacement component ΔY along the Y axis direction will increase (or decrease) the overlap areas TRSCOA2 and BRSCOA2 in the complementary pair CP2 and decrease (or increase) the overlap areas TRSCOA1 and BRSCOA1 in the complementary pair CP1. Similarly, a displacement of the disruptor element 551' that has a displacement component ΔX along the X axis direction will increase (or decrease) the overlap areas TRSCOA3 and BRSCOA3 in the complementary pair CP3 and decrease (or increase) the overlap areas TRSCOA4 and BRSCOA4 in the complementary pair CP4.

As previous outlined, in operation, currents induced in the disruptor element 551' by the changing magnetic field of the field generating configuration 560 cause opposing magnetic fields. Generally speaking, the signal component SIGTRSCi (or SIGBRSCi) generated in any rotary sensing coil TRSCi (or BRSCi), will be reduced as a proximate portion of the disruptor element 551' comes closer to that rotary sensing coil along the axial direction, or increases its overlap TRSCOAi (or BRSCOAi) with the rotary sensing coil.

It will be appreciated that for the complementary pairs CP1-CP4 indicated in FIG. 5 (wherein the coils in a complementary pair CPi may be identical and aligned along the axial direction), at the illustrated undeflected position UNDF, the signal components in each complementary pair (e.g., SIGTRSC1 and SIGBRSC1) may be approximately balanced. According to previously outlined principles, for a portion of the disruptor element 551' proximate to a complementary pair (e.g., CP1), for small displacements ΔZ such as those expected in operation, the net signal components (e.g., SIGTRSC1 and SIGBRSC1) may vary approximately linearly, and inversely compared to one another. Thus, the sum of such signals for a complementary pair CPi may be nominally insensitive to a ΔZ associated with the proximate portion of the disruptor element 551'. Furthermore, in the implementation shown in FIG. 5, the edges of the disruptor element 551' may be parallel to the X and Y directions, such that, within the operating motion ranges +/−Rx and +/−Ry, a Y direction displacement component does not alter the rotary coil sensing overlap areas TRSCOA3, BRSCOA3, and/or TRSCOA4 and BRSCOA4, and an X direction displacement component does not alter the rotary coil sensing overlap areas TRSCOA2, BRSCOA2, and/or TRSCOA1 and BRSCOA1. Therefore, in one implementation, a rotary displacement or position component ΔX along the X direction may be indicated by or correspond to the following signal relationship, ideally regardless of ΔZ and/or ΔY:

$$\Delta X = \text{function of } [(SIGTRSC3 + SIGBRSC3) - \qquad (Eq.\ 6)$$
$$(SIGTRSC4 + SIGBRSC4)] \div [(SIGTNSCC + SIGBNSCC)]$$

Similarly, in one implementation, a rotary displacement or position component ΔY along the Y direction may be indicated by or correspond to the following signal relationship, ideally regardless of ΔZ and/or ΔX:

$$\Delta Y = \text{function of } [(SIGTRSC2 + SIGBRSC2) - \qquad (Eq.\ 7)$$
$$(SIGTRSC1 + SIGBRSC1)] \div [(SIGTNSCC + SIGBNSCC)]$$

These signal relationships are exemplary only, and not limiting. In various implementations, these signal relationships may be adjusted or compensated by additional calibration or signal processing operations, including operations that reduce the effects of geometric and/or signal cross-coupling between various displacement directions or signal components, if desired. As noted above, the signals SIGTNSCC and SIGBNSCC from the normalization coils TNSCC and BNSCC may provide a measurement of the generated magnetic field (e.g., corresponding to the changing magnetic flux that is generated by the field generating coil configuration 560). As indicated by EQUATIONS 5-7, the position measurements (e.g., the signals from the rotary and axial sensing coils) may be scaled to the measured signal to make them relatively insensitive to variations in the amplitude of the generated field (as generated by the field generating coil configuration 560).

In some particularly advantageous implementations, the sensing coil portion (e.g., 570) and the disruptor element (e.g., 551') are configured wherein, for any complementary pair CPi and any disruptor element displacement increment within the operating motion ranges +/−Rz, +/−Rx, and +/−Ry, both the magnitude and sign of the change in overlap areas TRSCOAi and BRSCOAi associated with that disruptor displacement increment are the same in that complementary pair. In some such implementations, the sensing coil portion is configured wherein each complementary pair CPi comprises a top rotary sensing coil TRSCi and a bottom rotary sensing coil BRSCi characterized in that the shape of their interior areas nominally coincide when projected along the axial direction. It may be seen that the particular implementation of the stylus position detection portion 511' shown in FIG. 5 conforms to this description. However, it will be appreciated that various configurations of complementary pairs may be used, and the particular configurations shown in FIG. 5 are exemplary only and not limiting.

In some implementations, the sensing coil portion (e.g., 570) and the disruptor element (e.g., 551') may be configured wherein the disruptor element comprises at least N straight sides, and, for any respective complementary pair CPi, a respective one of the straight sides of the disruptor element transects both the top rotary sensing coil TRSCi and the bottom rotary sensing coil BRSCi of that respective complementary pair. In some such implementations, N=4, and the at least N straight sides include 4 sides that are arranged parallel to the sides of a rectangular or square shape. It may be seen that the particular implementation of the stylus position detection portion 511' shown in FIG. 5 conforms to this description. However, it will be appreciated that various combinations of complementary pairs configurations and disruptor element edge configurations may be used, and the combination of the particular configurations shown in FIG. 5 is exemplary only and not limiting. In particular, in other implementations, the disruptor may have a circular or other shape (e.g., as may correspond to the implementation of FIG. 4, etc.)

FIG. 6 is a partially schematic isometric diagram of certain elements of the stylus position detection portion 511' shown in FIG. 5, including schematically represented connections CONN to a block diagram of one exemplary implementation of signal processing and control circuitry 680. As shown in FIG. 6, the signal processing and control circuitry 680 is operably connected to the various coils of the stylus position detection portion 511'. In the implementation shown in FIG. 6, the signal processing and control circuitry 680 comprises a digital controller/processor 681, that may govern various timing and signal connection or exchange operations between its various interconnected components, which include a drive signal generator 682, an amplification/switching portion 683, a sample and hold portion 684, a multiplexing portion 685, and an A/D convertor portion 686. In various implementations, the digital controller/processor 681 may include one or more processors, such as coupled to a memory storing program instructions that when executed by the one or more processors cause the one or more processors to perform certain methods, routines etc. (e.g., such as those described herein). For example, digital controller/processor 681 may also perform various digital signal processing operations to determine the output signals APSOut and RPSOut, as previously outlined with reference to FIG. 2. Portions of the design and operation of the signal processing and control circuitry 680 may generally be recognized and understood by one of ordinary skill in the art, according to known principles. For example, in one implementation, the certain elements of the signal processing and control circuitry 680 may be designed and operated by analogy to corresponding elements disclosed in U.S. Pat. No. 5,841,274, which is hereby incorporated herein by reference in its entirety.

In operation, the drive signal generator 682 is operated to provide a changing coil drive signal Dsig to the field generating coil configuration 560 (e.g., as described in more detail below with respect to FIGS. 7-10), which generates a changing magnetic flux generally along the axial direction in the disruptor motion volume MV in response to the coil drive signal. The amplification/switching portion 683 is configured to input the signals RSIGs, ASIGs and NSIGs from the sensing coil portion 570, comprising respective signal components provided by the respective rotary, axial and normalization sensing coils located on the top and bottom coil substrates (e.g., the previously outlined signal components SIGTASCC, SIGBASCC, SIGTRSC1-SIGTRSC4, SIGBRSC1-SIGBRSC4, SIGTNSCC, SIGBN- SCC). In some implementations, the amplification/switching portion 683 may include switching circuits which may combine various analog signals to provide various desired sum or difference signals (e.g., by appropriate serial or parallel connections, or the like), for example as prescribed in the relationships shown in EQUATIONS 5-7, or the like. However, in other implementations, the amplification/switching portion 683 may perform only amplification and signal conditioning operations (e.g., potentially including signal inversion operations), with all signal combination operations performed in other circuit portions.

The sample and hold portion 684 inputs the various analog signals from the amplification/switching portion 683, and performs sample and hold operations according to known principles, e.g., to simultaneously sample and hold all respective signal components that arise from the various respective sensing coils of the sensing coil portion 570. In one implementation, the multiplexing portion 685 may connect various signals to the A/D convertor portion 686 sequentially, and/or in combinations related to various desired signal relationships (for example, as prescribed in the relationships shown in EQUATIONS 5-7, or the like). The A/D convertor portion 686 outputs corresponding digital signal values to the digital controller/processor 681.

The digital controller/processor 681 may then process and/or combine the digital signal values according to various desired relationships (for example, as prescribed in the relationships shown in EQUATIONS 5-7, or the like), to determine and output the output signals APSOut and RPSOut, which are indicative of the axial position and the rotary position of at least one of the disruptor element 551' or the stylus 506 (e.g., relative to the frame of the measuring probe). In some implementations the digital controller/processor 681 may be configured such that the output signals APSOut and RPSOut directly indicate the three-dimensional position of the stylus 506 or its probe tip 548 (e.g., relative to the frame of the measuring probe). In other implementations, it may be configured to output signals that indirectly indicate the three-dimensional position of the stylus 506 or its probe tip 548 (e.g., relative to the frame of the measuring probe), and a host system (e.g., a CMM) may input such signals and perform additional processing to further combine or refine such signals and determine the three-dimensional position of the stylus 506 or its probe tip 548 relative to the measuring probe and/or relative to an overall coordinate system used for CMM measurements.

As will be described in more detail below, FIG. 7-10 illustrate the field generating coil 561 as driven by various implementations of a drive circuit (e.g., such as may be included in the drive signal generator 682 of FIG. 6, and as may provide a drive signal DSig to the field generating coil 561). In various implementations, in relation to certain principles as described in more detail below, various portions (e.g., a stylus suspension portion, a stylus position detection portion, a disruptor configuration, etc. or parts thereof) of a measuring probe (e.g., as described above with respect to FIGS. 2-6, etc.) may be characterized as forming and/or being included as parts of a three-dimensional inductive position transducer (e.g., which senses and provides output signals indicative of the position of the disruptor configuration, etc.)

Figure 7:
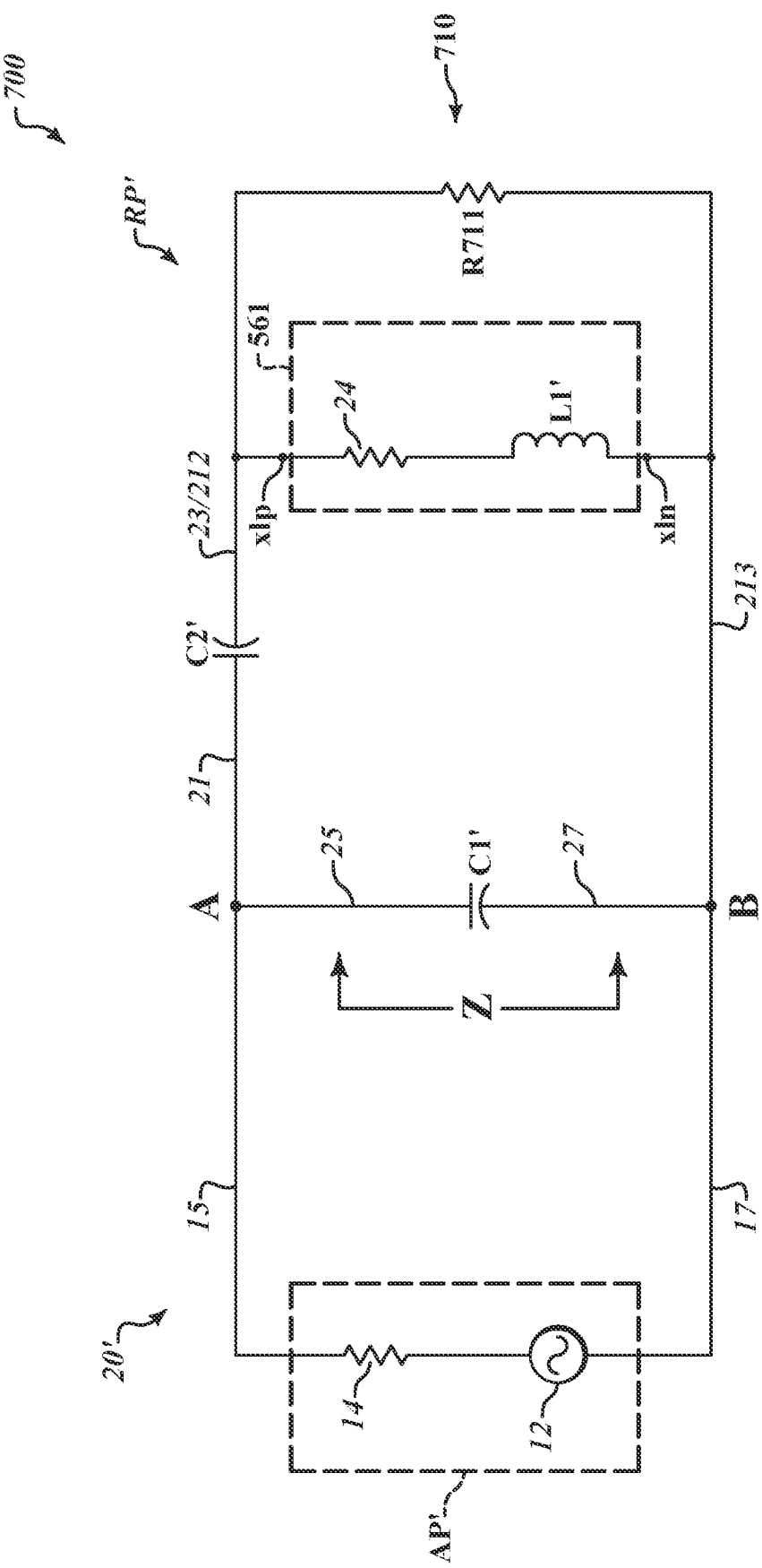
FIG. 7 is a schematic diagram of a field generating coil as driven by a first implementation of a drive circuit and with a temperature dependent component as coupled in parallel with the field generating coil.

FIG. 7 is a schematic diagram of the field generating coil 561 as driven by a drive circuit 700 (e.g., such as may be included in the drive signal generator 682 of FIG. 6) and with a temperature dependent compensation portion 710 that includes a temperature dependent component R711 as coupled in parallel with the field generating coil 561. The temperature dependent compensation portion 710 will be described in more detail below.

FIG. 7 is noted to illustrate certain circuit principles (e.g., of a field generating coil oscillator as will be described in more detail below). In field generating coil oscillators (e.g., such as illustrated in FIGS. 7-10), in various implementations the voltage across the field generating coil is increased, and is ideally maximized. It will be appreciated that there may always be some distributed stray resistance in the field generating coil. In view of this stray resistance, to increase, and ideally maximize, the voltage across the field generating coil, the power dissipated in this stray resistance may be increased, and ideally maximized.

To increase, and ideally maximize, the power dissipated in the stray resistance, it may be desirable for the impedance of the load to approach, and possibly match, the impedance of the output of the drive circuit. This relies on the well-known circuit principles that impedance matching maximizes the power delivered to the load. For the field generating coil(s) of the stylus position detection portion being driven using the circuit principles as described herein, matching the load impedance, or at least approaching the impedance of the load, in various exemplary embodiments, is desirably accomplished by at least approaching canceling the reactance of the field generating coil and by incorporating the stray resistance into a desired load resistance. As described herein, this is accomplished using a circuit that combines features of both series and parallel resonant circuits. FIG. 7 illustrates such a combined series and parallel resonant circuit, as included in an impedance transformer 20'.

As shown in FIG. 7, the impedance transformer 20', having an impedance Z, comprises a first capacitor C1', a second capacitor C2', and a field generating coil 561 (e.g., including a resistive portion 24 and an inductive portion L1'). Furthermore, as shown in FIG. 7, as part of the drive circuit 700, an amplifier portion AP' (e.g., including an amplifier as part of a signal generator portion 12 and a resistor portion 14) is connected by a signal line 15 to a first node, the input node A.

The input node A is connected by a signal line 21 to the capacitor C2'. A signal line 25 connects the input node A to the capacitor C1'. A signal line 23 connects the capacitor C2' to the field generating coil 561 (e.g., which includes the resistive portion 24 and the inductive portion L1'). In various implementations, the signal line 23 may correspond to, or may be coupled to, a signal line 212, such as representing a connection (e.g., and as may provide/carry a drive signal DSig) from a drive circuit (e.g., of the drive signal generator 682 of the signal processing and control circuitry 680) to the field generating coil 561 of the stylus position detection portion. A signal line 213 connects the field generating coil 561 to a node B. A signal line 17 connects the node B to the signal generator 12. A signal line 27 connects the capacitor C1' to the node B.

Thus, as shown in FIG. 7, the capacitor C2', the resistive portion 24 and the inductive portion L1' of the field generating coil 561 form a series RCL circuit between the nodes A and B. Furthermore, the capacitor C1' is connected in parallel with this RCL series circuit between the nodes A and B. As noted above, the resistive portion 24 is the stray resistance in the loop formed by the field generating coil 561. The capacitor C2' is thus the series capacitor, while the capacitor C1' is the parallel capacitor.

The combined input impedance Z of the capacitors C1' and C2', the resistive portion 24 and the inductive portion L1' of the field generating coil 561 is the load on the amplifier portion AP'. In various implementations, the resistive portion 14 is the output resistance of the signal generator 12 to which the input impedance Z of the impedance transformer 20' is matched. In particular, by choosing the capacitances $C_1$ and $C_2$ of the capacitors C1' and C2' appropriately, the impedance Z may approach (e.g., may be approximately equal to) the resistance $R_s$ of the resistive portion 14 of the signal generator 12.

It will be appreciated that, in the impedance transformer 20', the topology of the impedance transformer 20' is determined by the relative values of the resistance of the resistive portion 24 and the resistance of the source resistive portion 14. In various implementations, if the resistance of the resistive portion 24 is less than the resistance of the source resistive portion 14, the first element to the "left" of the load may be a series element, for which the parallel element may then follow. If the relationship is reversed, such that the resistance of the resistive portion 24 is greater than the resistance of the source resistive portion 14, the first element to the "left" of the load may be the parallel element, for which the series element may then follow.

It should further be appreciated that in various implementations, the series and parallel elements forming the input impedance Z may not necessarily be capacitors. That is, in some exemplary implementations, the series and parallel elements may be inductors. However, in many cases, in the drive circuit 200 for driving the field generating coil 561, capacitors may be used as the series and parallel circuit elements.

Figure 8:
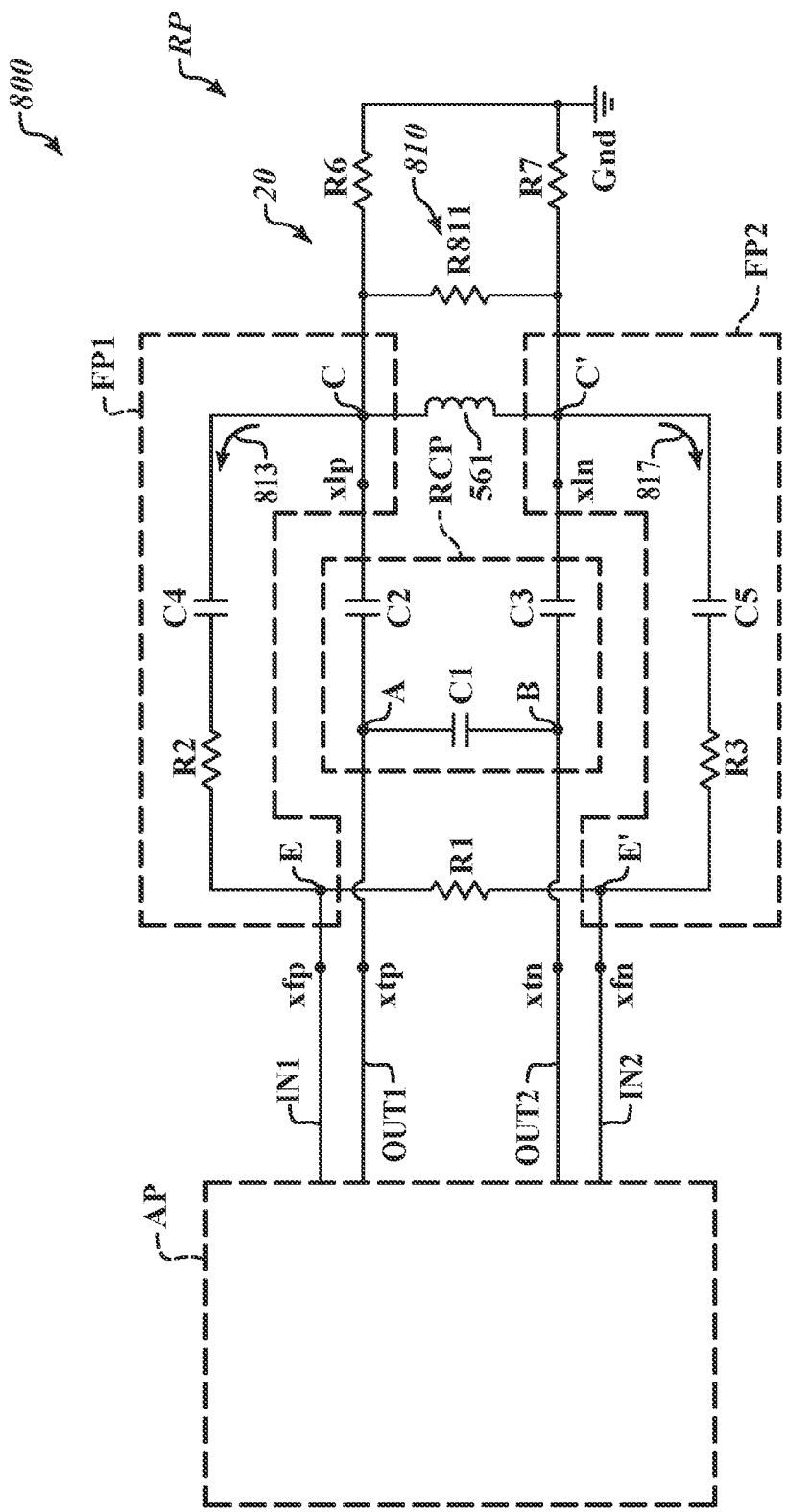
FIG. 8 is a schematic diagram of a field generating coil as driven by a second implementation of a drive circuit and with a temperature dependent component as coupled in parallel with the field generating coil.

FIG. 8 is a schematic diagram of the field generating coil 561 as driven by a drive circuit 800 (e.g., such as may be included in the drive signal generator 682 of FIG. 6) and with a temperature dependent compensation portion 810 that includes a temperature dependent component R811 as coupled in parallel with the field generating coil 561. The temperature dependent compensation portion 810 will be described in more detail below.

In certain implementations, the drive circuit 800 shown in FIG. 8 may be characterized as including a double-ended oscillator. As will be described in more detail below, the drive circuit 800 includes various capacitors and resistors (e.g., capacitors C1, C2, C3, C4 and C5, and resistors R1, R2, R3, R4, R5, R6 and R7), each of which will be understood to have respective first and second terminals, which are utilized for respective connections (e.g., a resistor or capacitor that is coupled between first and second elements will be understood to have a respective terminal coupled to each element).

The drive circuit 800 is configured to drive the first field generating coil 561, which has first and second coil terminals xlp and xln, and a coil impedance. As will be described in more detail below, the drive circuit 800 includes at least a resonant circuit portion RCP and an amplifier portion AP. Briefly, the resonant circuit portion RCP is connected to the first and second coil terminals xlp and xln, and includes at least a first resonant circuit portion component (e.g., capacitor C1), a second resonant circuit portion component (e.g., capacitor C2), and a third resonant circuit portion component (e.g., capacitor C3).

The first resonant circuit portion component (e.g., capacitor C1) is coupled between a first resonant circuit portion node (e.g., node A) and a second resonant circuit portion node (e.g., node B). The first resonant circuit portion node (e.g., node A) is separated from the first coil terminal (e.g., xlp) by at least the second resonant circuit portion component (e.g., capacitor C2). The second resonant circuit portion node (e.g., node B) is separated from the second coil terminal (e.g., xln) by at least the third resonant circuit portion component (e.g., capacitor C3). The amplifier portion AP is connected to the first and second resonant circuit portion circuit nodes (e.g., nodes A and B), and has an output impedance during operation. The amplifier portion AP is configured to provide an oscillating drive signal at the first and second resonant circuit portion nodes (nodes A and B). The resonant circuit portion RCP, amplifier portion AP, and the various associated connections will each be described in more detail below.

As shown in FIG. 8, the amplifier portion AP comprises a first input terminal xfp (e.g., corresponding to a first amplifier input IN1), a second input terminal xfn (e.g., corresponding to a second amplifier input IN2), a first output terminal xtp (e.g., corresponding to a first amplifier output OUT1), and a second output terminal xtn (e.g., corresponding to a second amplifier output OUT2). A circuit path 813 is connected between the first output terminal xtp and the first input terminal xfp of the amplifier portion AP. Likewise, a circuit path 817 is connected between the second output terminal xtn and the second input terminal xfn of the amplifier portion AP. In various implementations, the circuit paths 813 and 817 may be characterized as feedback loops. The circuit elements forming these circuit paths will be described in more detail below. As utilized herein, the terms "voltage", "voltage level", "specified voltage level" may in various instances refer to the amplitude of the corresponding oscillating/varying voltage (e.g., as occurring across the field generating coil 561, etc.) This may be contrasted with a voltage such as that of a power supply voltage (e.g., which may be a DC voltage) which may not be intended to oscillate/vary.

In FIG. 8, the impedance transformer portion 20 is included in the drive circuit 800. A resonator portion RP includes at least the field generating coil 561 and the impedance transformer portion 20 which comprises the resonant circuit portion RCP which comprises the first capacitor C1, the second capacitor C2, and the third capacitor C3. The three capacitors (i.e., C1, C2 and C3) are used to make the circuit fully differential. With respect to the first output terminal xtp of the amplifier portion AP (i.e., which is connected to the input node A), the capacitor C2, the field generating coil 561 and the capacitor C3 are connected in series between the input nodes A and B, while the capacitor C1 is connected in parallel with the series-connected capacitor C2, the field generating coil 561, and the capacitor C3 between the input nodes A and B. With respect to the second output terminal xtn of the amplifier portion AP (i.e., which is connected to the input node B), the capacitor C3, the field generating coil 561 and the capacitor C2 are connected in series between the input nodes B and A, while the capacitor C1 is connected in parallel with the series-connected capacitor C3, the field generating coil 561 and the capacitor C2 between the input nodes B and A. As noted above, the capacitors C1-C3 along with the field generating coil 561 create at least part of the resonator portion RP (e.g., in accordance with the capacitance of the capacitors and the inductance of the field generating coil). In various implementations, the resonator portion RP may also include other elements and/or portions (e.g., such as first and second filter portions FP1 and FP2, etc.)

A resistor R6 is connected between a first terminal xlp of the field generating coil 561 and ground, and a resistor R7 is coupled between a second terminal xln of the field generating coil 561 and ground. The first terminal xlp is connected to a node C and the second terminal xln is connected to a node C'. The resistors R6 and R7 provide a direct current (DC) path to ground for the terminals xlp and xln. In various implementations, this configuration may thus prevent the terminals xlp and xln from floating (e.g., from having no connection to ground for which the voltages at the terminals may otherwise vary in accordance with charge accumulation, etc.). In various implementations, it may be desirable for the resistors R6-R7 to have relatively high values (e.g., significantly higher than the impedance of the resonator portion) so they do not have a significant influence on the resonator portion loop gain.

With respect to the circuit path 813 (e.g., which in certain implementations may be characterized as a feedback loop), the capacitor C4 and the resistor R2 are part of a first filter portion FP1 and are coupled in series between the node C and the node E (i.e., and are thus coupled in series between the first terminal xlp of the field generating coil 561 and the first input terminal xfp/first amplifier input IN1 of the amplifier portion AP). In various implementations, the capacitor C4 and resistor R2 may be referenced as a first filter portion capacitor C4 and a first filter portion resistor R2, each with respective first and second terminals for making the respective connections as described herein. The node C may be referenced as a first filter portion first node C and the node E may be referenced as a first filter portion second node E. More specifically, the first filter portion capacitor C4 may have a respective first terminal connected to the first coil terminal xlp/first filter portion first node C, and a respective second terminal connected to a first terminal of the first filter portion resistor R2. The second terminal of the first filter portion resistor R2 may be connected to the first amplifier input IN1/terminal xfp/first filter portion second node E.

Similarly, with respect to the circuit path 817 (e.g., which in certain implementations may be characterized as a feedback loop), the capacitor C5 and the resistor R3 are part of a second filter portion FP2 and are coupled in series between the node C' and a node E' (i.e., and are thus coupled in series between the second terminal xln of the field generating coil 561 and the second input terminal xfn/second amplifier input IN2 of the amplifier portion AP). In various implementations, the capacitor C5 and resistor R3 may be referenced as a second filter portion capacitor C5 and a second filter portion resistor R3, each with respective first and second terminals for making the respective connections as described herein. The node C' may be referenced as a second filter portion first node C' and the node E' may be referenced as second filter portion second node E'. More specifically, the second filter portion capacitor C5 may have a respective first terminal connected to the second coil terminal xln/second filter portion first node C', and a respective second terminal connected to a first terminal of the second filter portion resistor R3. The second terminal of the second filter portion resistor R3 may be connected to the second amplifier input IN2/terminal xfn/second filter portion second node E'.

In various implementations, the resistor R2 and capacitor C4 in series, and the resistor R3 and capacitor C5 in series, create a high pass filter configuration (e.g., as part of a feedback loop configuration) which may be tuned to compensate for phase shift in the amplifier portion AP. In various implementations, in order for a desired oscillation to occur, it is desirable for the feedback loop configuration to generally be in phase with the coil voltage of the field generating coil 561 with a gain greater than 1. In various implementations, the first filter portion FP1 (e.g., including the capacitor C4 and the resistor R2) and the second filter portion FP2 (e.g., including the capacitor C5 and the resistor R3) may also or alternatively be characterized as a first phase shifter portion and a second phase shifter portion, respectively. In various implementations, the capacitors C4 and C5 may be variable capacitors (e.g., which may enable additional tuning in relation to the associated functions).

The resistor R1 is coupled between the node E and the node E' (i.e., and is thus connected between the first input terminal xfp and the second input terminal xfn). The resistor R2 is coupled between the node E and the capacitor C4 (i.e., and is thus connected between the first input terminal xfp and the capacitor C4). The resistor R3 is connected between the node E' and the capacitor C5 (i.e., and is thus connected between the second input terminal xfn and the capacitor C5). In various implementations, the resistors R1-R3 form a resistor divider, which may be utilized to feed the coil voltage of the field generating coil 561 back to the amplifier portion AP (e.g., as part of the integrated circuit). The resistor divider may be utilized to ensure that feedback signals do not exceed the power supply voltage Vdd (e.g., of the integrated circuit and which supplies the amplifier portion AP). Thus, the resistors R2 and R3 may be characterized as being utilized for both a resistor divider function, and a phase shifting function (e.g., as described above with respect to the filter portions FP1 and FP2).

It should be appreciated that, in the exemplary implementation of the drive circuit 800 shown in FIG. 8, emphasis has been placed on circuit symmetry, rather than minimizing the number of separate circuit elements in the drive circuit 800. Thus, it should be appreciated that, in various other exemplary implementations of the drive circuit 800, various ones of the capacitors C1, C2, C3, C4 and C5, and various ones of the resistors R1, R2, R3, R6 and R7 may be combined into single circuit elements.

In various implementations, the drive circuit 800 may be implemented in a layout placing it close to the field generating coil 561 to be driven (e.g., to minimize the stray effects of wiring and connections which may otherwise intervene, and to provide more-predictable and stable performance characteristics for the system, etc.). For example, the drive circuit 800 and its associated field generating coil 561 may be assembled, or directly fabricated, onto a shared member, such as a printed circuit board, or a flex-circuit, or the like.

With respect to the impedance transformer 20, it will be appreciated that by providing both the serially-connected and the parallel-connected capacitors (e.g., parallel-connected capacitor C1 and series-connected capacitors C2 and C3), relative to the field generating coil 561, two degrees of freedom are provided in selecting capacitances for these capacitors. More specifically, in various implementations there are two different degrees of freedom in the impedance transformer 20 (e.g., including the resonant frequency and the input impedance). Thus, the resonant frequency of the impedance transformer 20 can be prescribed or selected independently of the impedance Z of the impedance transformer 20 (e.g., such as in accordance with certain principles as described above with respect to FIG. 7). In various implementations, the impedance transformer 20 may help attenuate and phase-shift frequencies other than the tuned center frequency, so that the closed-loop gain is sufficient for sustained oscillation only at the center frequency.

In certain conventional field generating coil drive circuits, either the resonant frequency or the impedance could be selected, but once either the resonant frequency or the impedance was selected, the impedance or the resonant frequency, respectively, was fixed. Thus, by allowing both the resonant frequency and the impedance to be prescribed or selected independently of each other, the impedance transformer 20 (e.g., which in some instances may also be referred to as a dual or multi capacitor resonator) enables field generating coils to be driven efficiently.

Additionally, the voltage across the field generating coil that can be obtained using the impedance transformer 20 is higher than can be obtained in a single-capacitor resonator. Thus, the resolution of the system can be improved. At the same time, because the resonant frequency of the impedance transformer 20 can be tuned, in various implementations a sine wave can be provided tuned to the resonant frequency such that the field generating coil can be driven more efficiently, and the output (e.g., of the stylus position detection portion) determined more accurately, than with other distorted (e.g., non-sine wave) waveforms.

Moreover, in various implementations because harmonics may be removed from the drive signal (i.e., as provided to the field generating coil 561), less electromagnetic radiation is radiated to the environment. This may allow the drive circuit to be used in more EMF-sensitive environments, with lower-cost packaging.

It should also be appreciated that, in the drive circuit 800, in various implementations the oscillation frequency of the drive circuit 800 may track any drift of the field generating coil. Thus, the oscillation of the drive circuit 800 may stay on-resonance better than drive circuits that are controlled by an externally-located oscillator circuit. That is, by including the field generating coil inductance into the resonating circuit that sets the resonant frequency of the oscillator, in various implementations the oscillator may produce a maximal drive signal at the precise frequency of the resonator.

Because the tolerances of the component values, such as the capacitance, resistance, and inductance, of the various capacitors, resistors and the field generating coil may vary, the actual resonant frequency of any actual drive circuit built according to the principles described above and shown in FIG. 8 may not be exactly at a designed frequency. However, in various implementations the drive circuit 800 may automatically find the oscillation frequency that produces the strongest signal (e.g., as resulting in the strongest output signal from the stylus position detection portion, etc.)

It will be appreciated that in various implementations in relation to the operations (e.g., the double-ended oscillator operations) of the drive circuit 800, the net voltage across the field generating coil 561 over time may be nominally/essentially zero. Therefore, there may essentially be no voltage signal that passes through the field generating coil 561. As a result, there may be little or no capacitive coupling in the portion (e.g., in the drive signal generator 682 of the signal processing and control circuitry 680) using the drive circuit 800. In addition, because the double-ended oscillator operations essentially provide twice as much signal strength at the same frequency (e.g., as compared to an implementation with a single-ended oscillator drive circuit), the double-ended oscillator operations of the drive circuit 800 may allow the same signal magnitude to be obtained (e.g., by the synchronous demodulator 140) in essentially half the time. Thus, the double-ended oscillator operations of the drive circuit 800 may have an effectively shorter sampling window.

As noted above, in the implementation of FIG. 7, the temperature dependent compensation portion 710 may include a temperature dependent component R711 which is coupled in parallel with the field generating coil 561. Similarly, in the implementation of FIG. 8, the temperature dependent compensation portion 810 may include a temperature dependent component R811 which is coupled in parallel with the field generating coil 561.

As will be described in more detail below, in various implementations the inclusion of a temperature dependent compensation portion (e.g., in relation compensating for the effects of temperature changes that may affect the current/voltage of the field generating coil, etc.) may be particularly desirable, in that other components/circuits of the system may be selected/designed to operate based at least in part on the voltage/current of the field generating coil. For example, the measured signal levels of certain of the sensing coils may be affected in different ways by different magnetic fields/different magnetic flux as resulting from different voltage/current levels of the field generating coil. In general, when the voltage/current of the field generating coil is not at a specified level, the operations/functions/results of the other circuits and components that are designed and specified for operating in conjunction with the specified voltage/current of the field generating coil, may behave differently (e.g., some measured signals may respond in a linear manner while others may not, such as the normalization sensing coils TNSC and BNSC) thus resulting in different relative outputs, which may affect the performance/measurement accuracy of the system. Thus, the inclusion of one or more temperature dependent compensation portions (e.g., for compensating for the effects of temperature changes that may affect the current/voltage of the field generating coil, etc.) may be particularly advantageous in regard to such issues.

As related to such issues, in various implementations, the quality factor (Q) of an inductor (e.g., a coil) may be defined as the ratio of its inductive reactance to its resistance at a given frequency, and is a measure of its efficiency. The higher the Q factor of the inductor, the closer it may approach the behavior of an ideal inductor. The Q factor of an inductor may in certain implementations be defined as $Q=\omega L/R$, where L is the inductance, R is the resistance (e.g., direct current resistance) and the product $\omega L$ is the inductive reactance (e.g., with $\omega$ corresponding to a frequency of operation). In accordance with this equation, it will be appreciated that if the resistance R increases (e.g., due to an increase in temperature, etc.), the Q factor may be reduced. A Q factor may also be determined in relation to a portion of a circuit including an inductor and other components that are coupled to the inductor.

In various implementations, the Q factor of the field generating coil 561 may correspondingly be defined as the ratio of its inductive reactance to its resistance at a given frequency, and is a measure of its efficiency. The higher the Q factor of the field generating coil 561 (and/or of a portion of a circuit including the coil 561), the closer it approaches the behavior of an ideal inductor. In various implementations, for the equation $Q=\omega L/R$, (e.g., in accordance with the representation in FIG. 7) for the field generating coil 561 the R may be the resistance of the resistive portion 24, and the L may be the inductance of the inductive portion L1'. As noted above, the equation indicates that if the resistance R increases (e.g., as caused by an increase in temperature, etc.), the Q factor may correspondingly be reduced. In various implementations as described herein, a Q factor may be affected by, and/or otherwise determined in relation to, a portion of a circuit which includes other components that are coupled to the field generating coil 561, such as may also affect the overall signal response, etc.

In various implementations, certain measuring probes have been observed to exhibit a temperature dependent change (e.g., to a normalized gain, and even more so to individual signals). In a measuring probe such as that described herein, measurements suggest the temperature dependent signal sizes are primarily a result of Q factor changes in the field generating coil 561 (e.g., from a temperature dependence of a copper trace resistance of the field generating coil, as corresponding to a resistive portion of the field generating coil, etc.) As noted above, as part of the operation of the measuring probe, the field generating coil 561 is utilized to generate a magnetic field, which may be at least partially disrupted by a disruptor element 551, and sensed by position sensing coils (e.g., axial and rotary sensing coils ASC and RSC), for which the corresponding signals may be scaled to (e.g., divided by) sensed signals from normalization sensing coils NSC. In various implementations, unless otherwise addressed, the temperature dependent signal sizes (e.g., which may vary in accordance with the Q factor changes of the field generating coil 561) in combination with certain non-linear characteristics (of the measured signals in relation to the normalization sensing coils), may decrease the effectiveness of the division operation, such that some normalized gain change is still observed.

In accordance with principles as disclosed herein, such issues may be at least partially addressed through utilization of temperature dependent compensation portions. For example, in various implementations, the temperature dependent compensation portions 710 and 810 including the temperature dependent components R711 and R811 (e.g., positive temperature coefficient (PTC) resistors, etc.) of FIGS. 7 and 8 may be characterized as helping to stabilize the voltage across the field generating coil 561. The function of the temperature dependent components R711 and R811 may not necessarily stabilize the Q factor in relation to the operation of the field generating coil 561, but may instead be configured to shift current from the temperature dependent components R711 and R811 into the field generating coil 561 when temperature increases, so as to compensate for a reduction of the Q factor (e.g., as may occur due to an increase in the resistance of the resistive portion of the field generating coil 561 at the higher temperature, etc.) It is noted that this shift in current (i.e., from the temperature dependent components R711 and R811 into the field generating coil 561) due to the increase in temperature of the temperature dependent components R711 and R811 thus causes relatively more current to flow through the field generating coil 561 when driven by the coil drive signal (i.e., as provided by the drive circuit 700 or 800) than if the characteristic of the temperature dependent components R711 and R811 had not changed (i.e., if the resistance of the components R711 and R811 had not increased with the increase in temperature).

In various alternative implementations, a temperature dependent compensation portion may include one or more different or alternative temperature dependent components, such as may in some instances be coupled in different locations for being coupled to the field generating coil 561. For example, as noted above the feedback loops of the filter portions FP1 and FP2 (e.g., including the resistors R2 and R3 and capacitors C4 and C5) are coupled to the field generating coil 561, and are also coupled to the resistor R1. In an alternative implementation of the temperature dependent compensation portion 810 of FIG. 8 as described above, in addition to or as an alternative to the component R811 (which in certain implementations may be included or may be removed), certain of the resistors R1, R2, R3 and/or the capacitors C4 and C5 may be temperature dependent components of the temperature dependent compensation portion 810. For example, one or more of the resistors R1, R2 and R3 may be temperature dependent components of the temperature dependent compensation portion 810 with a characteristic (e.g., a resistance) that increases as temperature increases (e.g., may be PTC resistors). Also or alternatively, the capacitors C4 and C5 may be temperature dependent components of the temperature dependent compensation portion 810 with a characteristic (e.g., a capacitance) that decreases as temperature increases (e.g., may be negative temperature coefficient (NTC) capacitors).

The function of the temperature dependent components (e.g., including certain of the components R1, R2, R3, C4 and/or C5 as described above) may not necessarily stabilize the Q factor in relation to the operation of the field generating coil 561, but may instead be configured to shift current from the parallel feedback loops of the filter portions FP1 and FP2 into the field generating coil 561 when temperature increases so as to compensate for a reduction of the Q factor (e.g., as may occur due to an increase in the resistance of the resistive portion of the field generating coil 561 at the higher temperature, etc.) It is noted that this shift in current (i.e., from the parallel feedback loops of the filter portions FP1 and FP2 into the field generating coil 561) due to the increase in temperature of the temperature dependent components (e.g., including certain of the components R1, R2, R3, C4 and/or C5 as described above) thus causes relatively more current to flow through the field generating coil 561 when driven by the coil drive signal (i.e., as provided by the drive circuit 700 or 800) than if the characteristic of the temperature dependent components (e.g., including certain of the components R1, R2, R3, C4 and/or C5 as described above) had not changed (i.e., if the resistance of the components R1, R2, and/or R3 had not increased and/or the capacitance of the capacitors C4 and C5 had not decreased with the increase in temperature).

In applications where spatial considerations may be important (e.g., for which certain temperature dependent components such as PTC resistors may have a certain size and/or spatial requirements), it may in some implementations be considered desirable to utilize fewer such temperature dependent components when possible. For such applications, the implementation of the temperature dependent compensation portion 810 as including a single temperature dependent component R811 (e.g., a single PTC resistor) may be considered as preferable over an alternative implementation including more temperature dependent components (e.g., including temperature dependent components R1, R2 and R3, such as each comprising a PTC resistor and/or the temperature dependent components C4 and C5, such as each comprising an NTC capacitor).

Figure 9:
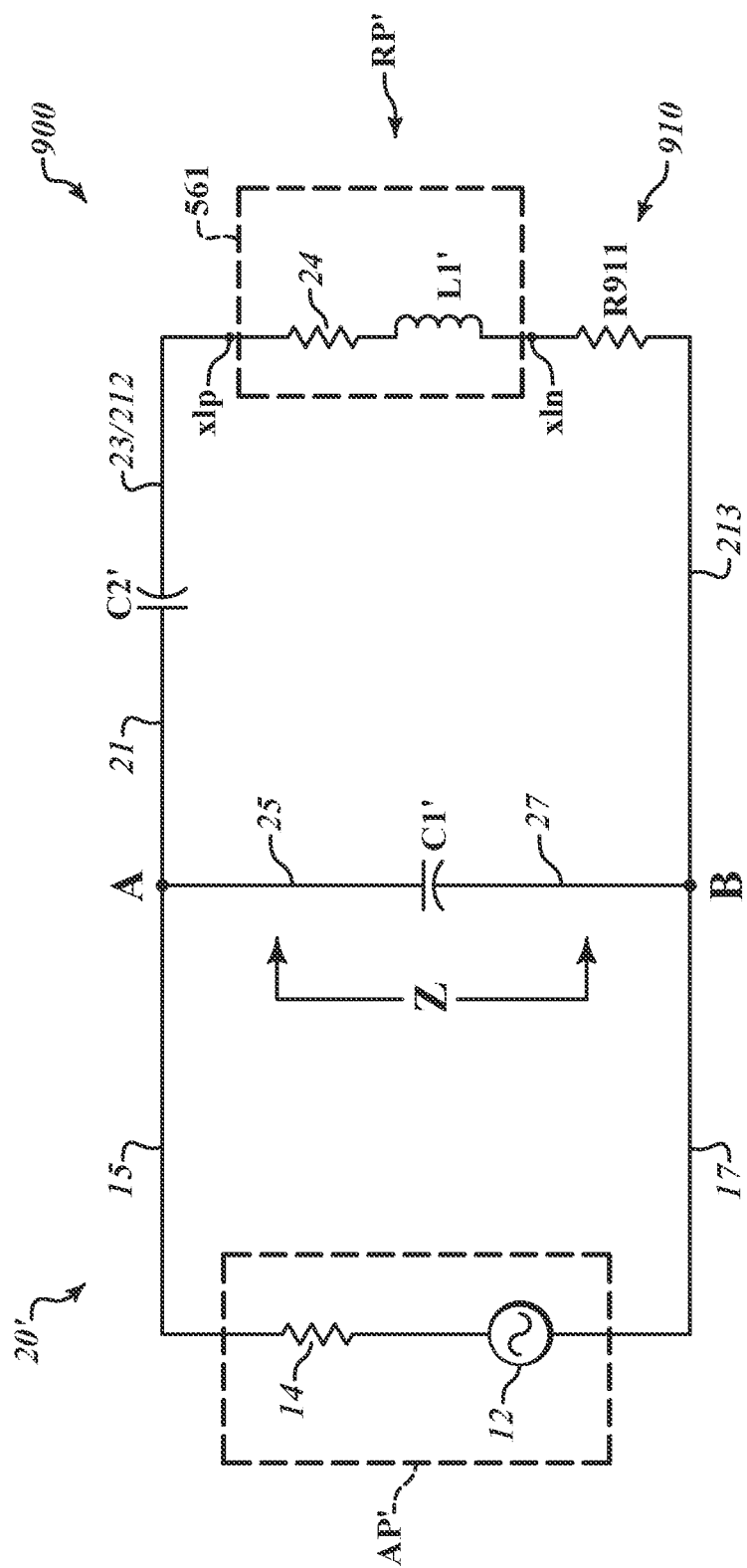
FIG. 9 is a schematic diagram of a field generating coil as driven by an implementation of a drive circuit similar to that of FIG. 7 and with a temperature dependent component as coupled in series with the field generating coil.
Figure 10:
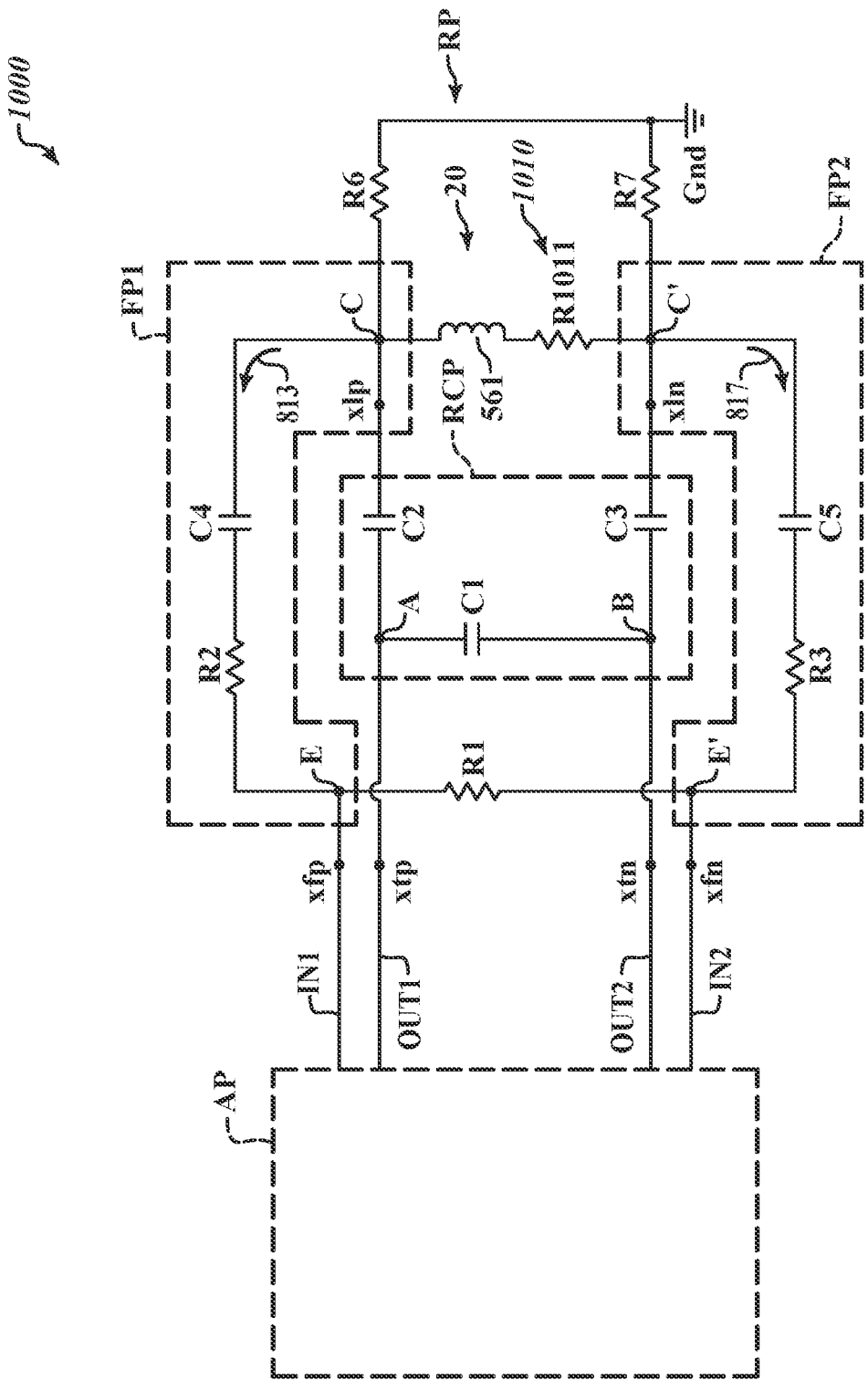
FIG. 10 is a schematic diagram of a field generating coil as driven by an implementation of a drive circuit similar to that of FIG. 8 and with a temperature dependent component as coupled in series with the field generating coil.

FIG. 9 is a schematic diagram of the field generating coil 561 as driven by a drive circuit 900 (e.g., such as may be included in the drive signal generator 682 of FIG. 6) that has similar components and operations as the drive circuit 700 of FIG. 7, except as otherwise described below. A primary difference of the implementation of FIG. 9 is the inclusion of a temperature dependent compensation portion 910 including a temperature dependent component R911 which is coupled in series (i.e., rather than in parallel) with the field generating coil 561. FIG. 10 is a schematic diagram of the field generating coil 561 as driven by a drive circuit 1000 (e.g., such as may be included in the drive signal generator 682 of FIG. 6) that has similar components and operations as the drive circuit 800 of FIG. 8, except as otherwise described below. Similar to FIG. 9, a primary difference of the implementation of FIG. 10 is the inclusion of a temperature dependent compensation portion 1010 including a temperature dependent component R1011 which is coupled in series (i.e., rather than in parallel) with the field generating coil 561. As will be described in more detail below, the temperature dependent components R911 and R1011 may have a characteristic (e.g., a resistance) which decreases as temperature increases (e.g., in various implementations the temperature dependent components R911 and R1011 may be negative temperature coefficient (NTC) resistors).

In various implementations, the temperature dependent compensation portions 910 and 1010 including the temperature dependent components R911 and R1011 (e.g., NTC resistors, etc.) may be characterized as helping to stabilize the Q factor in relation to the field generating coil 561. For example, an increase in temperature may otherwise cause a certain amount of reduction in the Q factor (e.g., as may occur due to an increase in the resistance of the resistive portion of the field generating coil 561 at the higher temperature, etc.) However, the temperature dependent component R911 or R1011 (i.e., as coupled in series with the field generating coil 561) may operate to stabilize the Q factor by having a resistance that decreases as the temperature increases (i.e., thus at least partially counteracting the increase in resistance that may occur in the field generating coil 561). It is noted that this decrease in resistance of the temperature dependent component R911 or R1011 due to the increase in temperature thus causes relatively more current to flow through the field generating coil 561 when driven by the coil drive signal (i.e., as provided by the drive circuit 900 or 1000) than if the characteristic of the temperature dependent component R911 or R1011 had not changed (i.e., if the resistance of the component R911 or R1011 had not decreased with the increase in temperature).

As described above with respect to FIGS. 7-10, an impedance transformer 20 is utilized that allows high coil voltages (e.g., across the field generating coil 561) to be achieved. The impedance transformer 20 includes capacitors (e.g., capacitors C1-C3) and a field generating coil (e.g., coil 561) and may be at least part of a resonator portion RP (e.g., which in various implementations may also include filter portions, such as FP1 and FP2, etc.). In various implementations, three capacitors (e.g., capacitors C1-C3) are utilized to make the drive circuit (e.g., drive circuit 800) fully differential. A resistor divider (e.g., including resistors R1-R3) may be utilized to feed the coil voltage (e.g., of the field generating coil 561) back to the amplifier portion AP (e.g., as part of an integrated circuit). The resistor divider may be utilized to ensure that feedback signals do not exceed the power supply voltage (e.g., of the integrated circuit).

In various implementations, resistor-capacitor connections (e.g., including resistor R2 and capacitor C4 in series, and resistor R3 and capacitor C5 in series) create a high pass filter configuration (e.g., as part of a feedback loop configuration) which may be tuned to compensate for phase shift in the amplifier portion AP. In various implementations, in order for a desired oscillation to occur, the feedback loop configuration must generally be in phase with the coil voltage (e.g., of the field generating coil 561) with a gain greater than 1. In various implementations, certain resistance values (e.g., of resistors R6 and R7) are configured to keep terminals (e.g., terminals xlp and xln of the field generating coil 561) from floating (e.g., from having no connection to ground for which the voltages at the terminals may otherwise vary in accordance with charge accumulation, such as when the drive circuit is not being operated to provide the oscillating voltage across the field generating coil, etc.). A frequency of the drive circuit may be set by components (e.g., in accordance with the values of the associated capacitors and resistors) in a self-resonant manner (e.g., which may achieve low noise).

Figure 11A:
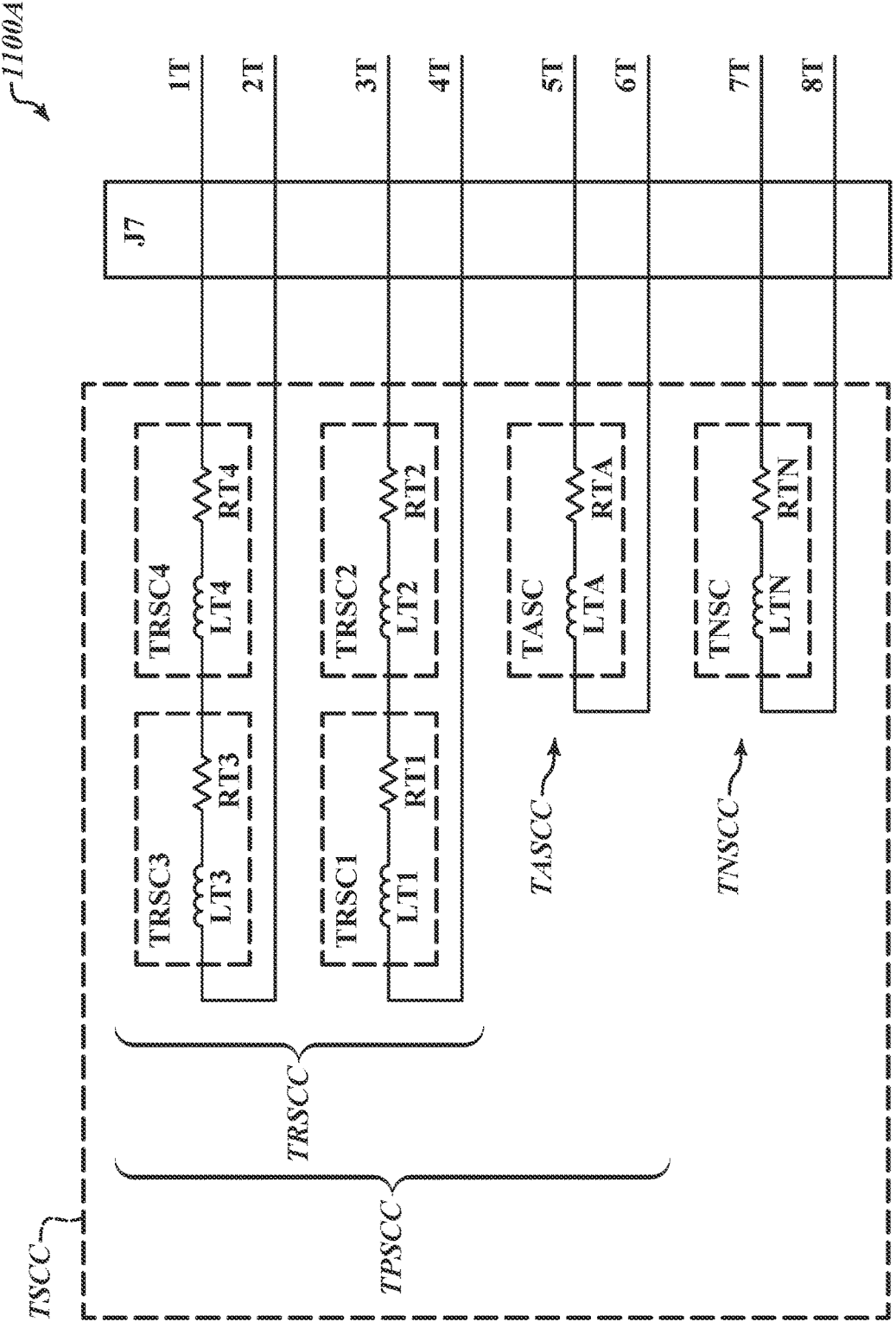
FIGS. 11A and 11B are diagrams showing an implementation of connections for a top sensing coil configuration and a bottom sensing coil configuration, respectively.
Figure 11B:
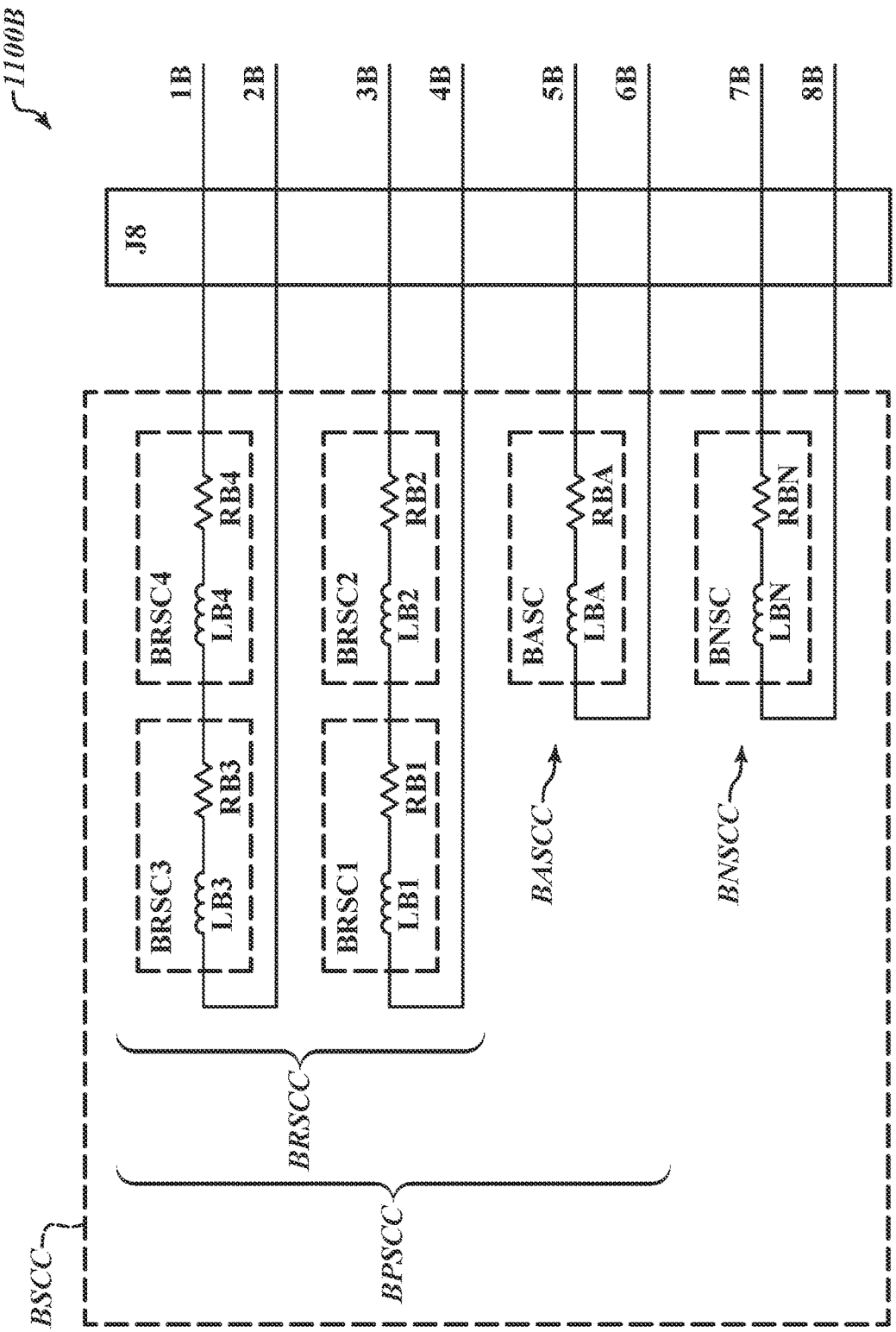

FIGS. 11A and 11B are diagrams showing an implementation of connections for a top sensing coil configuration TSCC and a bottom sensing coil configuration BSCC, respectively. In various implementations, the coils of FIGS. 11A and 11B correspond to the coils with similar reference numbers/characters as described previously herein (e.g., in relation to FIG. 6, etc.) As illustrated in FIGS. 11A and 11B, connector elements J7 and J8 may be configured to provide connection points/configurations for enabling connections and for which the various connections are indicated as corresponding to connection nodes 1T-8T and 1B-8B (e.g., which may in some implementations may be referenced as circuit nodes, and which various sensing coils are coupled between, as will be described in more detail below).

As illustrated in FIG. 11A, in accordance with a top sensing coil connection configuration 1100A, the top sensing coil configuration TSCC includes a top position sensing coil configuration TPSCC and a top normalization sensing coil configuration TNSCC. The top position sensing coil configuration TPSCC includes a top rotary sensing coil configuration TRSCC and a top axial sensing coil configuration TASCC. The top rotary sensing coil configuration TRSCC includes top rotary sensing coils TRSC1, TRSC2, TRSC3 and TRSC4. The top axial sensing coil configuration TASCC includes a top axial sensing coil TASC. The coils TRSC1, TRSC2, TRSC3 and TRSC4 and TASC of the top position sensing coil configuration TPSCC are all designated as top position sensing coils. The top normalization sensing coil configuration TNSCC includes a top normalization sensing coil TNSC.

In the example of FIG. 11A, each of the sensing coils is indicated as including both an inductive portion and a resistive portion. For example, the top rotary sensing coils TRSC1, TRSC2, TRSC3 and TRSC4 are each illustrated as including inductive portions LT1, LT2, LT3 and LT4, and resistive portions RT1, RT2, RT3 and RT4, respectively. The top axial sensing coil TASC includes an inductive portion LTA and a resistive portion RTA. The top normalization sensing coil TNSC includes an inductive portion LTN and a resistive portion RTN.

In various implementations, the top rotary sensing coils TRSC may be coupled together in various ways and/or at various locations (e.g., within the amplification/switching portion 683 of FIG. 6, or directly in the circuit areas of the coils, or in any other locations where such couplings may be made). In the example of FIG. 11A, the top rotary sensing coils TRSC3 and TRSC4 are coupled in series between the nodes 1T and 2T, and the top rotary sensing coils TRSC1 and TRSC2 are coupled in series between the nodes 3T and 4T. The top axial sensing coil TASC is coupled between the nodes 5T and 6T. The top normalization sensing coil TNSC is coupled between the nodes 7T and 8T. It will be understood that in accordance with standard conventions, each coil may have two terminals, and a coupling of the sensing coils to the nodes may correspond to a terminal of a respective sensing coil being coupled to each respective node.

As illustrated in FIG. 11B, in accordance with a bottom sensing coil connection configuration 1100B, the bottom sensing coil configuration BSCC includes a bottom position sensing coil configuration BPSCC and a bottom normalization sensing coil configuration BNSCC. The bottom position sensing coil configuration BPSCC includes a bottom rotary sensing coil configuration BRSCC and a bottom axial sensing coil configuration BASCC. The bottom rotary sensing coil configuration BRSCC includes bottom rotary sensing coils BRSC1, BRSC2, BRSC3 and BRSC4. The bottom axial sensing coil configuration BASCC includes a bottom axial sensing coil BASC. The coils BRSC1, BRSC2, BRSC3 and BRSC4 and BASC of the bottom position sensing coil configuration BPSCC are all designated as bottom position sensing coils. The bottom normalization sensing coil configuration BNSCC includes a bottom normalization sensing coil BNSC.

In the example of FIG. 11B, each of the sensing coils is indicated as including both an inductive portion and a resistive portion. For example, the bottom rotary sensing coils BRSC1, BRSC2, BRSC3 and BRSC4 are each illustrated as including inductive portions LB1, LB2, LB3 and LB4, and resistive portions RB1, RB2, RB3 and RB4, respectively. The bottom axial sensing coil BASC includes an inductive portion LBA and a resistive portion RBA. The bottom normalization sensing coil BNSC includes an inductive portion LBN and a resistive portion RBN.

In various implementations, the bottom rotary sensing coils BRSC may be coupled together in various ways and/or at various locations (e.g., within the amplification/switching portion 683 of FIG. 6, or directly in the circuit areas of the coils, or in any other locations where such couplings may be made). In the example of FIG. 11B, the bottom rotary sensing coils BRSC3 and BRSC4 are coupled in series between the nodes 1B and 2B, and the bottom rotary sensing coils BRSC1 and BRSC2 are coupled in series between the nodes 3B and 4B. The bottom axial sensing coil BASC is coupled between the nodes 5B and 6B. The bottom normalization sensing coil BNSC is coupled between the nodes 7B and 8B. It will be understood that in accordance with standard conventions, each coil may have two terminals, and a coupling of the sensing coils to the nodes may correspond to a terminal of a respective sensing coil being coupled to each respective node.

Figure 12:
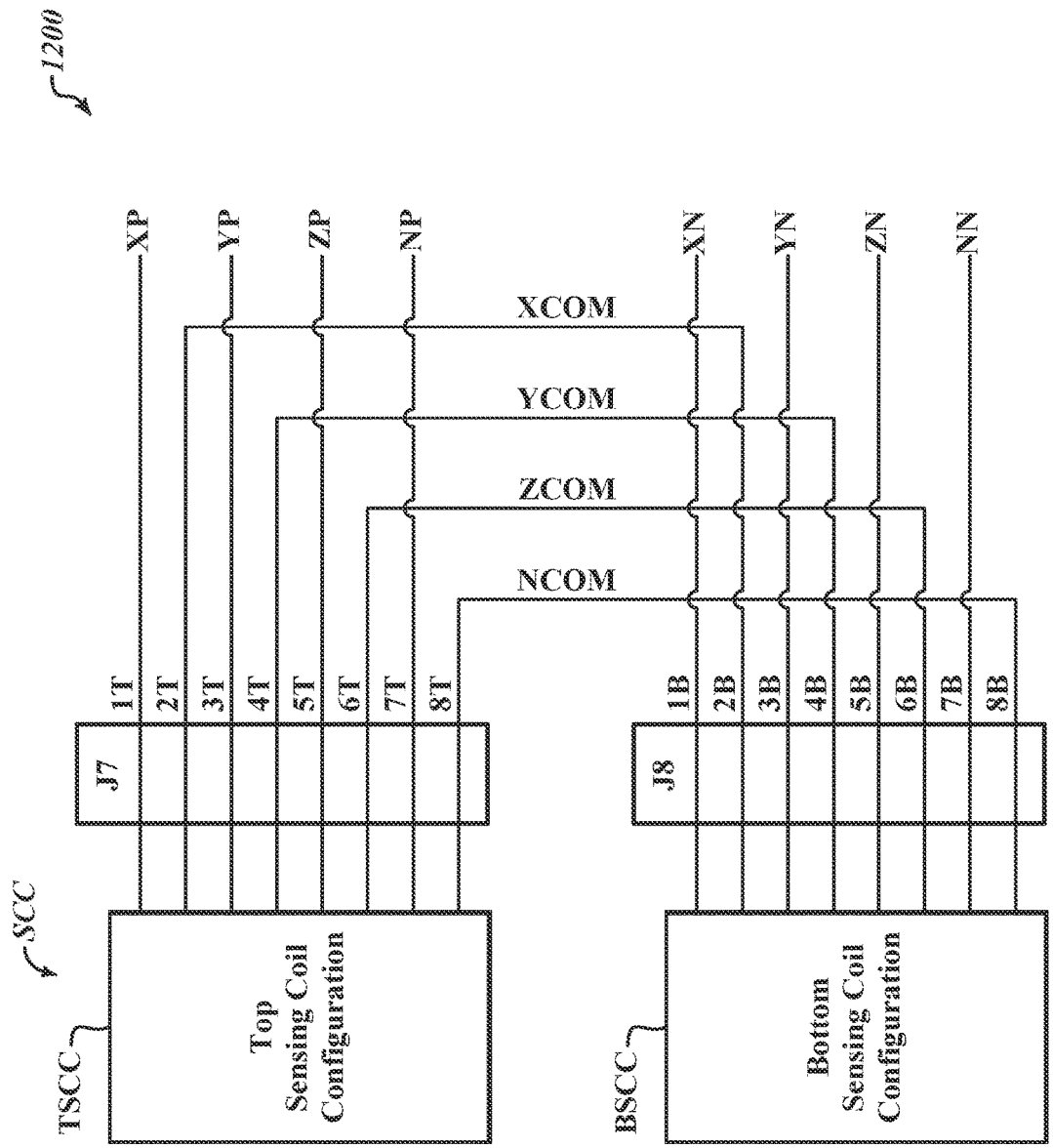
FIG. 12 is a diagram illustrating output signals and connections between top and bottom sensing coils of FIGS. 11A and 11B.

FIG. 12 is a diagram illustrating a sensing coil connection configuration 1200 with signal lines and connections between top and bottom sensing coils of FIGS. 11A and 11B. A sensing coil configuration SCC may include the sensing coils of the top sensing coil configuration TSCC and of the bottom sensing coil configuration BSCC. As illustrated in FIG. 12, the node 2T is connected by a signal line XCOM to the node 2B, which in accordance with the connections indicated in FIGS. 11A and 11B, corresponds to the top rotary sensing coil TRSC3 being coupled in series with the bottom rotary sensing coil BRSC3 by the signal line XCOM. In further regard to the connections as indicated in FIGS. 11A and 11B, the opposite side of the top rotary sensing coil TRSC3 is coupled to the top rotary sensing coil TRSC4 (i.e., for which the coils TRSC3 and TRSC4 are coupled in series), for which the opposite side of the top rotary sensing coil TRSC4 is connected to the node 1T, for which the node 1T is correspondingly connected to a signal line XP. Similarly, the opposite side of the bottom rotary sensing coil BRSC3, (i.e., the side that is not connected to the node 2B) is connected to the bottom rotary sensing coil BRSC4 (i.e., for which the coils BRSC3 and BRSC4 are coupled in series), and for which the opposite side of the bottom rotary sensing coil BRSC4 is connected to the node 1B, which is illustrated in FIG. 12 as coupled to a signal line XN.

Similarly, the node 4T is connected by a signal line YCOM to the node 4B, which in accordance with the connections illustrated in FIGS. 11A and 11B, corresponds to the top rotary sensing coil TRSC1 being coupled in series with the bottom rotary sensing coil BRSC1 by the signal line YCOM. As indicated in FIG. 11A, the top rotary sensing coil TRSC1 is coupled in series with the top rotary sensing coil TRSC2, for which the opposite side of the top rotary sensing coil TRSC2 is coupled to the node 3T, which is coupled to a signal line YP. As indicated in FIG. 11B, the bottom rotary sensing coil BRSC1 is coupled in series with the bottom rotary sensing coil BRSC2, for which the opposite side of the bottom rotary sensing coil BRSC2 is coupled to the node 3B, which is coupled to a signal line YN.

As further illustrated in FIG. 12, the node 6T is coupled by a signal line ZCOM to the node 6B. In accordance with the connections illustrated in FIGS. 11A and 11B, this corresponds to the top axial sensing coil TASC being coupled in series with the bottom axial sensing coil BASC by the signal line ZCOM. As illustrated in FIG. 11A, the opposite side of the top axial sensing coil TASC is coupled to the node 5T, which is coupled to a signal line ZP. As illustrated in FIG. 11B, the opposite side of the bottom axial sensing coil BASC is coupled to the node 5B, which is illustrated in FIG. 12 as coupled to a signal line ZN.

As further illustrated in FIG. 12, the node 8T is connected to the node 8B by a signal line NCOM. In accordance with the connections illustrated in FIGS. 11A and 11B, this corresponds to the top normalization sensing coil TNSC being coupled in series with the bottom normalization sensing coil BNSC by the signal line NCOM. As illustrated in FIG. 11A, the opposite side of the top normalization sensing coil TNSC is connected to the node 7T, which as illustrated in FIG. 12 is coupled to a signal line NP. As illustrated in FIG. 11B, the opposite side of the bottom normalization sensing coil BNSC is coupled to the node 7B, which as illustrated in FIG. 12 is coupled to a signal line NN.

In accordance with the signal lines XP, YP, ZP, NP, XN, YN, ZN and NN illustrated in FIG. 12, in various implementations the EQUATIONS 5-7 above may correspond to:

$$\Delta Z = \text{function of } [(ZP - ZN)/(NP - NN)] \quad \text{(Eq. 8)}$$

$$\Delta X = \text{function of } [(XP - XN)]/[(NP - NN)] \quad \text{(Eq. 9)}$$

$$\Delta Y = \text{function of } [(YP - YN)]/[(NP - NN)] \quad \text{(Eq. 10)}$$

It is noted that the signs in such equations may be in accordance with standard conventions (e.g., for differential measurements and/or as related to the polarity of the coils, etc.) As will be described in more detail below with respect to FIG. 13-18, in accordance with principles as disclosed herein, a temperature dependent compensation portion may include a temperature dependent component that may be included in a signal line of FIG. 12 and/or as coupled between certain nodes (e.g., in order to achieve certain improved signal effects, etc.)

Figure 13:
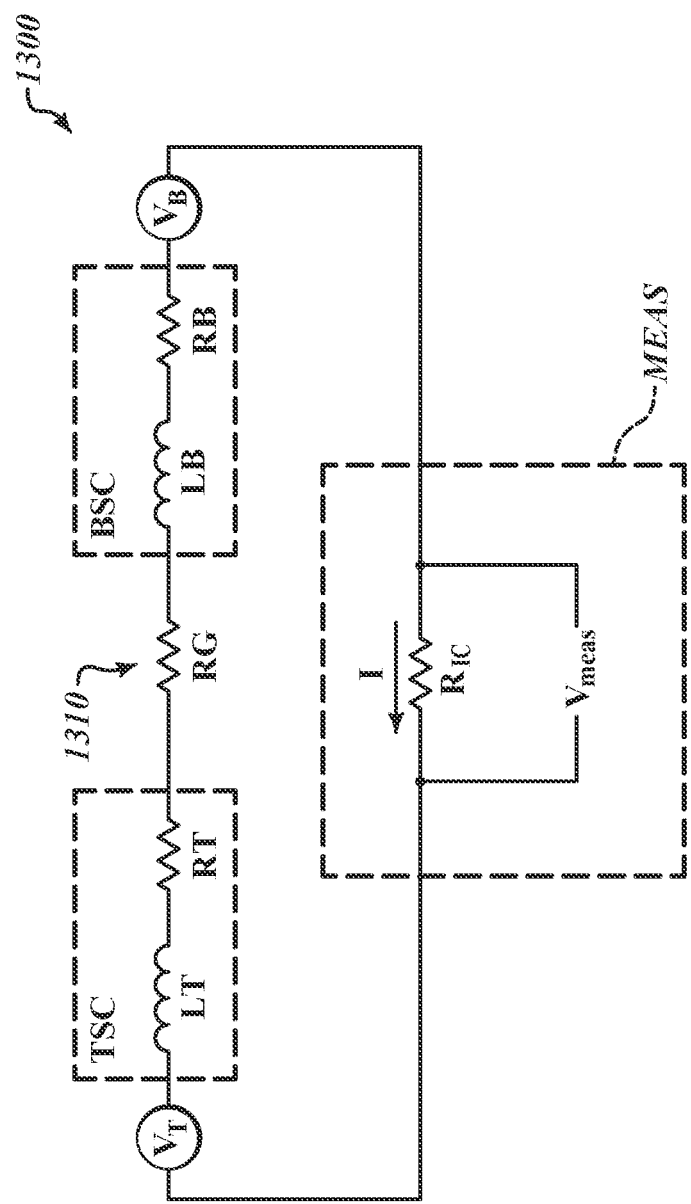
FIG. 13 is a diagram illustrating a temperature dependent component as coupled in series between a top sensing coil and a bottom sensing coil.

FIG. 13 is a diagram illustrating a sensing coil connection configuration 1300 including a temperature dependent component as coupled in series between a top sensing coil and a bottom sensing coil. More specifically, the configuration of FIG. 13 includes a top sensing coil TSC, a bottom sensing coil BSC, a temperature dependent compensation portion 1310 and a measuring portion MEAS. The top sensing coil TSC includes an inductive portion LT and a resistive portion RT, and the bottom sensing coil BSC includes an inductive portion LB and a resistive portion RB. A voltage $V_T$ results from an induced current in the top sensing coil TSC, and a voltage $V_B$ results from an induced current in the bottom sensing coil BSC (i.e., with the induced currents as resulting from a magnetic field/changing magnetic flux from the field generating coil 561 of FIG. 6, including as disrupted by a disrupter element 551).

The measuring circuit portion MEAS includes a resistive portion $R_{IC}$, which may have a voltage differential as corresponding to a differential between the induced voltages $V_B$ and $V_T$ (e.g., as may result in a current I through the resistive portion $R_{IC}$). A voltage measurement VMEAS may be measured across the two terminals of the corresponding resistive portion $R_{IC}$.

The temperature dependent compensation portion 1310 includes a temperature dependent component RG (e.g., a temperature dependent resistor, for which the resistance varies in accordance with the temperature, and which in some implementations may be referenced as a temperature dependent gain resistor). As will be described in more detail below with respect to FIGS. 14 and 15, the coupling of the temperature dependent component RG between the top sensing coil TSC and the bottom sensing coil BSC may correspond to a temperature dependent component as coupled within one of the signal lines XCOM, YCOM, ZCOM, or NCOM of FIG. 12.

Figure 14:
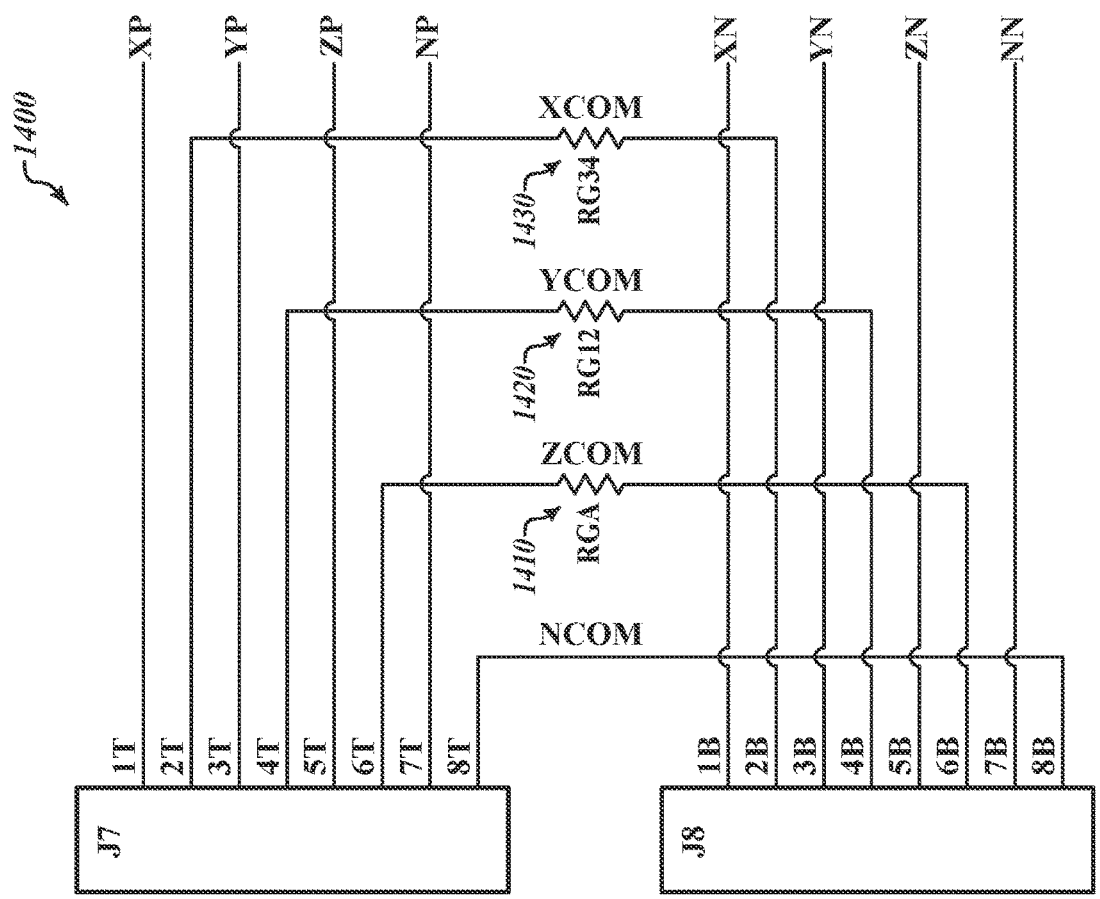
FIG. 14 is a diagram illustrating the connections of FIG. 12 as modified with three temperature dependent components similar to that of FIG. 13 as coupled in series between respective top position sensing coils and bottom position sensing coils.

FIG. 14 is a diagram illustrating a sensing coil connection configuration 1400 including the connections of FIG. 12 as modified with three temperature dependent compensation portions 1410, 1420 and 1430 (e.g., as may each be similar to the temperature dependent compensation portion 1310 of FIG. 13). As illustrated in FIG. 14, the temperature dependent compensation portion 1410 includes a temperature dependent component RGA as included in the signal line ZCOM. The temperature dependent compensation portion 1420 includes a temperature dependent component RG12, and the temperature dependent compensation portion 1430 includes a temperature dependent component RG34, as included in the signal lines YCOM and XCOM, respectively. In accordance with the connections as described above with respect to FIG. 12, the configuration of FIG. 14 thus corresponds to the temperature dependent component RGA being coupled in series between the top axial sensing coil TASC and the bottom axial sensing coil BASC, while the temperature dependent component RG12 is coupled in series between the top rotary sensing coil TRSC1 and the bottom rotary sensing coil BRSC1, and the temperature dependent component RG34 is coupled in series between the top rotary sensing coil TRSC3 and the bottom rotary sensing coil BRSC3.

In various implementations, each of the temperature dependent components RGA, RG12, and RG34 may be a temperature dependent resistor, with a characteristic for which the resistance decreases as temperature increases. As an example, each of the temperature dependent components RGA, RG12, and RG34 may be a negative temperature coefficient (NTC) resistor. In accordance with such a configuration, as temperature increases in each of the temperature dependent components RGA, RG12, and RG34, the resistance decreases in each of the temperature dependent components RGA, RG12, and RG34. Such may result in relatively more current flowing through the signal lines ZCOM, YCOM, and XCOM, and correspondingly through the coils that are connected by the respective signal lines ZCOM, YCOM, and XCOM. In contrast, it is noted in the configuration of FIG. 14 that the signal line NCOM does not include a temperature dependent component. As a result, an amount of current through the signal line NCOM may be relatively less affected by a change in temperature, for which a ratio of the current in each of the signal lines ZCOM, YCOM, XCOM to the current in the signal line NCOM may increase.

For example, a change in the characteristic of the temperature dependent component RGA (e.g., a reduction in the resistance) due to an increase in temperature of the temperature dependent component RGA, causes a ratio of the current in the signal line ZCOM to a current in the signal line NCOM to increase (i.e., wherein the current through the signal line ZCOM is in the axial sensing coils TASC and BASC, in accordance with the connections as illustrated in FIGS. 11A and 11B, and the current through the signal line NCOM is the current in the normalization sensing coils TNSC and BNSC). Similarly, a change in the characteristic of the temperature dependent component RG12 (e.g., a reduction in the resistance) due to an increase in temperature of the temperature dependent component RG12, causes a ratio of the current in the signal line YCOM to a current in the signal line NCOM to increase (i.e., wherein the current through the signal line YCOM is in the radial sensing coils TRSC1, TRSC2, BRSC1, BRSC2, in accordance with the connections as illustrated in FIGS. 11A and 11B, and the current through the signal line NCOM is the current in the normalization sensing coils TNSC and BNSC). Similarly, a change in the characteristic of the temperature dependent component RG34 (e.g., a reduction in the resistance) due to an increase in temperature of the temperature dependent component RG34, causes a ratio of a current in the signal line XCOM to a current in the signal line NCOM to increase (i.e., for which the current through the signal line XCOM corresponds to the current in the radial sensing coils TRSC3, TRSC4, BRSC3, and BRSC4, in accordance with the connections as illustrated in FIGS. 11A and 11B, and the current through the signal line NCOM corresponds to the current in the normalization sensing coils TNSC and BNSC).

As described herein, the signals from the rotary and axial sensing coils are scaled to (e.g., divided by) the signals from the normalization sensing coils, as part of the signal processing. In various implementations, the effects produced by the temperature dependent compensation portions of FIG. 14 may be characterized as increasing the relative gain of the signals of the rotary and axial sensing coils (e.g., in relation to the signals of the normalization sensing coils). The various implementations, such effects are utilized to counteract an observed effect in the circuitry, whereby temperature increases otherwise result in a temperature dependent change (e.g., as corresponding to the normalized gain as exhibited as a negative gain of the rotary and axial sensing coils). By utilizing the temperature dependent compensation portions to compensate for such temperature dependent affects that may otherwise occur, the overall accuracy of the processed position signals and of the system is increased.

Figure 15:
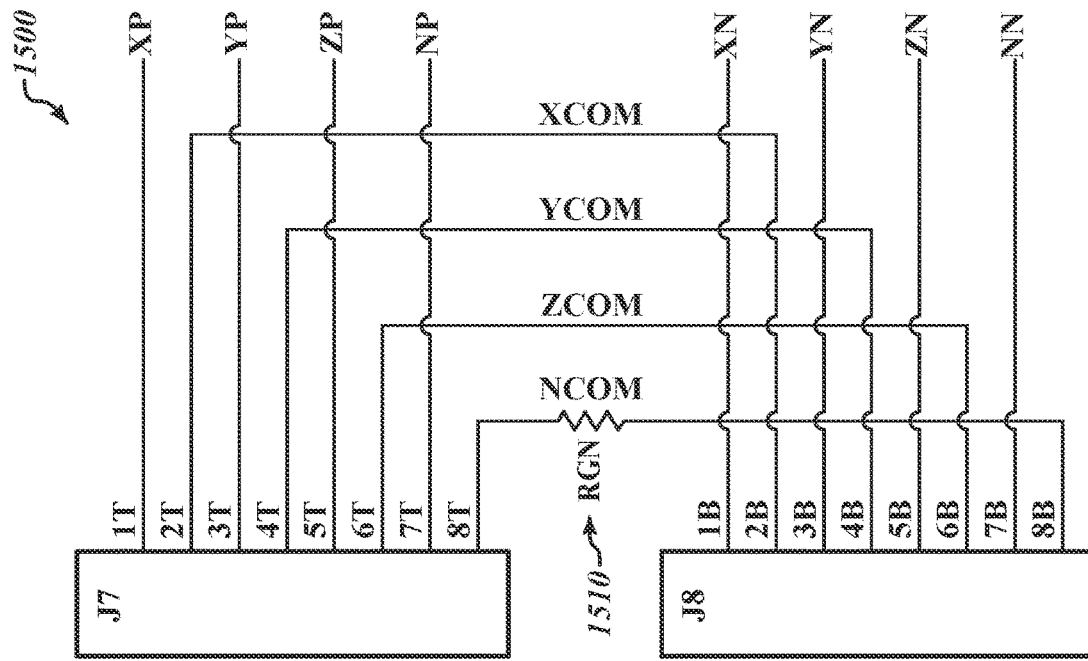
FIG. 15 is a diagram illustrating the connections of FIG. 12 as modified with a temperature dependent component similar to that of FIG. 13 as coupled in series between a top normalization sensing coil and bottom normalization sensing coil.

FIG. 15 is a diagram illustrating a sensing coil connection configuration 1500 including the connections of FIG. 12, as modified with a temperature dependent compensation portion 1510 (e.g., as may be similar to the temperature dependent compensation portion 1310 of FIG. 13). As illustrated in FIG. 15, the temperature dependent compensation portion 1510 includes a temperature dependent component RGN as included in the signal line NCOM. In various implementations, the temperature dependent component RGN may have a characteristic (e.g., a resistance) which increases as temperature increases (e.g., may be a PTC resistor, etc.). Correspondingly, as temperature increases and the resistance of the temperature dependent component RGN increases, relatively less current may flow through the signal line NCOM (i.e., and correspondingly in the normalization coils TNSC and BNSC, in accordance with the connections as illustrated in FIGS. 11A and 11B).

Since the signal lines XCOM, YCOM, and ZCOM do not include temperature dependent components in the implementation of FIG. 15, the decrease in current in the signal line NCOM results in a ratio of each of the currents in the signal lines ZCOM, YCOM, and XCOM to the current in the signal line NCOM increasing. As described above with respect to FIG. 14, this corresponds to an increase in a ratio of the currents in the axial and rotary sensing coils to the current in the normalization sensing coils. More specifically, a change in the characteristic of the temperature dependent component RGN (e.g., an increase in the resistance) due to an increase in temperature of the temperature dependent component RGN, causes a ratio of the current in the signal lines XCOM, YCOM and ZCOM to a current in the signal line NCOM to increase (i.e., wherein the current through the signals lines XCOM, YCOM and ZCOM is in the respective position sensing coils, in accordance with the connections as illustrated in FIGS. 11A and 11B, and the current through the signal line NCOM is the current in the normalization sensing coils TNSC and BNSC). This achieves a similar result as described above with respect to FIG. 14, for which by utilizing the temperature dependent compensation portion to compensate for temperature dependent affects that may otherwise occur, the overall accuracy of the processed position signals and of the system may be increased.

It is noted that in implementations where it is desirable to utilize temperature dependent components that have different values/resistances (e.g., in relation to the rotary sensing coils versus the axial sensing coils, such as where the effect of temperature on the gain may be greater for the rotary sensing coils than for the axial sensing coils), that the configuration of FIG. 14 may be preferred. For example, in the configuration of FIG. 14, temperature dependent components RG12 and RG34 may be utilized that have different resistive values than the temperature dependent component RGA. Conversely, the configuration of FIG. 15 (and/or a combination of the configurations of FIGS. 14 and 15) may be preferred for certain other applications (e.g., where it may be desirable to utilize fewer numbers of temperature dependent components and/or where certain types of temperature dependent components may vary in terms of size, availability, cost, etc.)

Figure 16:
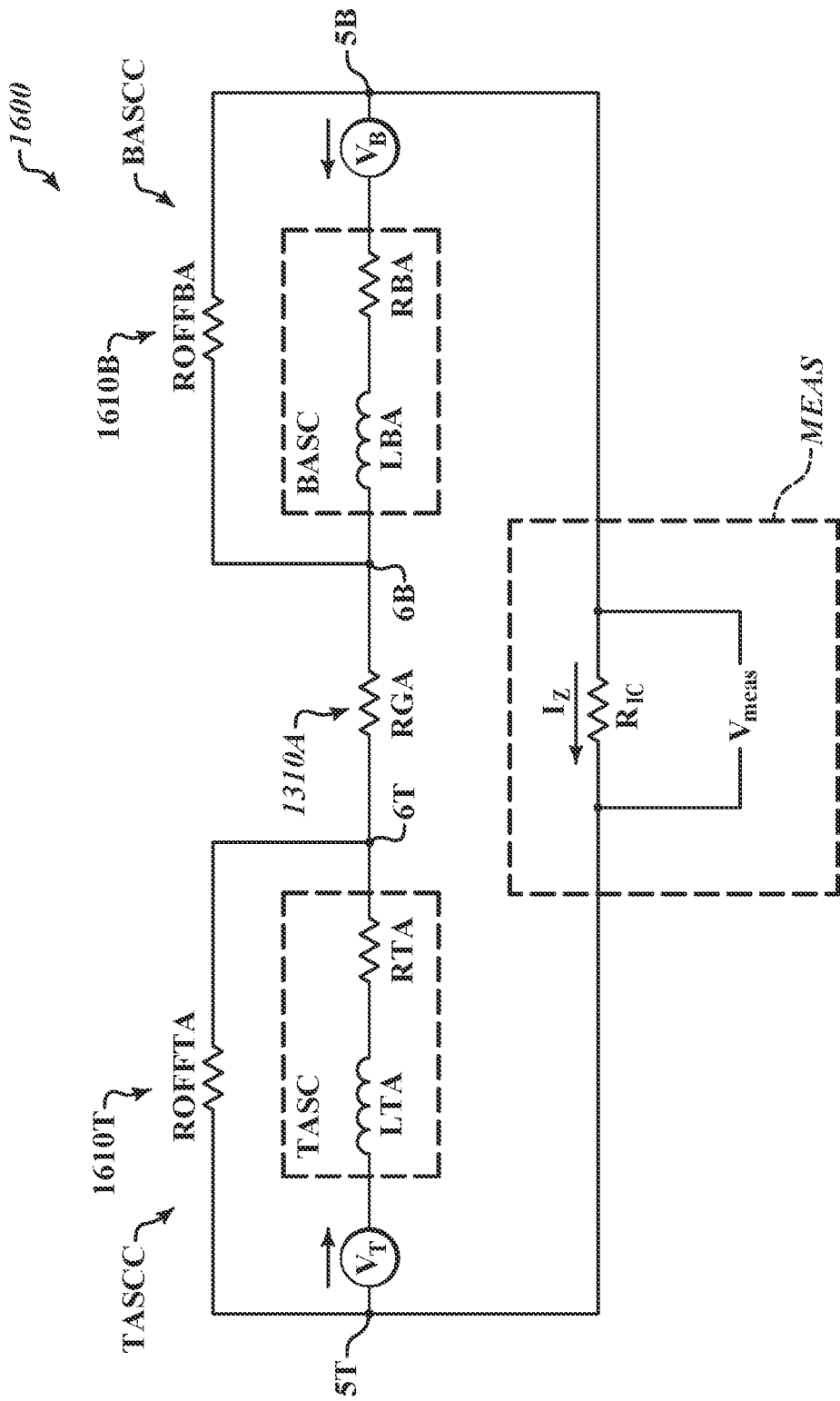
FIG. 16 is a diagram illustrating a first temperature dependent component similar to that of FIG. 13 as coupled in series between a top axial sensing coil and a bottom axial sensing coil and at least a second temperature dependent component as coupled in parallel with one of the axial sensing coils.

FIG. 16 is a diagram illustrating a sensing coil connection configuration 1600 including a temperature dependent compensation portion 1310A as similar to that of FIG. 13, and additionally including compensation portions 1610T and 1610B, at least one of which may be a temperature dependent compensation portion. In FIG. 16, certain components are similar to those of FIG. 13 and will be understood to operate similarly, except as otherwise described below. In FIG. 16, the top sensing coil is more specifically designated as the top axial sensing coil TASC of the top axial sensing coil configuration TASCC, and as including the inductive portion LTA and the resistive portion RTA. Similarly, the bottom sensing coil is more specifically designated as the bottom axial sensing coil BASC of the bottom axial sensing coil configuration BASCC, and as including the inductive portion LBA and the resistive portion RBA.

The top axial sensing coil TASC is indicated as connected between the nodes 5T and 6T, and the bottom axial sensing coil BASC is indicated as connected between the nodes 5B and 6B (e.g., in accordance with the connections as illustrated in FIGS. 11A and 11B.) The corresponding temperature dependent compensation portion 1310A is illustrated as including the temperature dependent component RGA (e.g., which will be understood to function similarly as described above with respect to FIG. 14). As noted above, FIG. 16 is also illustrated as including compensation portions 1610T and 1610B, as including components ROFFTA and ROFFBA, respectively. In various implementations, at least one of the compensation portions 1610T or 1610B is a temperature dependent compensation portion, and for which at least one of the components ROFFTA or ROFFBA is correspondingly a temperature dependent component.

For example, in one implementation, a temperature dependent compensation portion 1610B may include a temperature dependent component ROFFBA, which may have a characteristic (e.g., a resistance) which decreases due to an increase in temperature of the temperature dependent component (e.g., may be a NTC resistor, etc.). In one such configuration, the compensation portion 1610T may include a component ROFFTA that is a "normal" resistor. As a result, when a temperature increases, the resistance of the temperature dependent component ROFFBA may decrease, such that relatively more current may flow through the temperature dependent component ROFFBA, relative to the current that flows through the component ROFFTA. Since the components ROFFBA and ROFFTA are coupled in parallel with the axial coils BASC and TASC, respectively, this effect results in relatively less current flowing in the bottom axial sensing coil BASC than flows in the top axial sensing coil TASC (e.g., due to the divisions of current between the component ROFFBA and the coil BASC, and between the component ROFFTA and the coil TASC).

More specifically, for a given induced signal in each of the axial sensing coils BASC and TASC, an increase in temperature will cause a ratio of the current through the top axial sensing coil TASC to the current through the bottom axial sensing coil BASC to increase. This effect is intended to compensate for a temperature dependent offset that has been observed to occur primarily in the Z direction in relation to temperature increases in the measuring probe. In various implementations, this offset may be characterized as occurring due to material thermal expansion (e.g., of the material of the measuring probe) and in various implementations may also have some contributions that occur from the sensing configuration of the measuring probe. Through utilization of a temperature dependent compensation portion as illustrated in FIG. 16, compensation may be provided for the temperature dependent position offset that has been observed for the measuring probe. It will be appreciated that as an alternative implementation of the configuration of FIG. 16, a temperature dependent compensation portion 1610T may include a temperature dependent component ROFFTA, which may have a characteristic (e.g., a resistance) which increases due to an increase in temperature (e.g., a PTC resistor), which similar to the configuration as described above, may result in the ratio of current in the top axial sensing coil TASC to the current in the bottom axial sensing coil BASC increasing with temperature.

Figure 17:
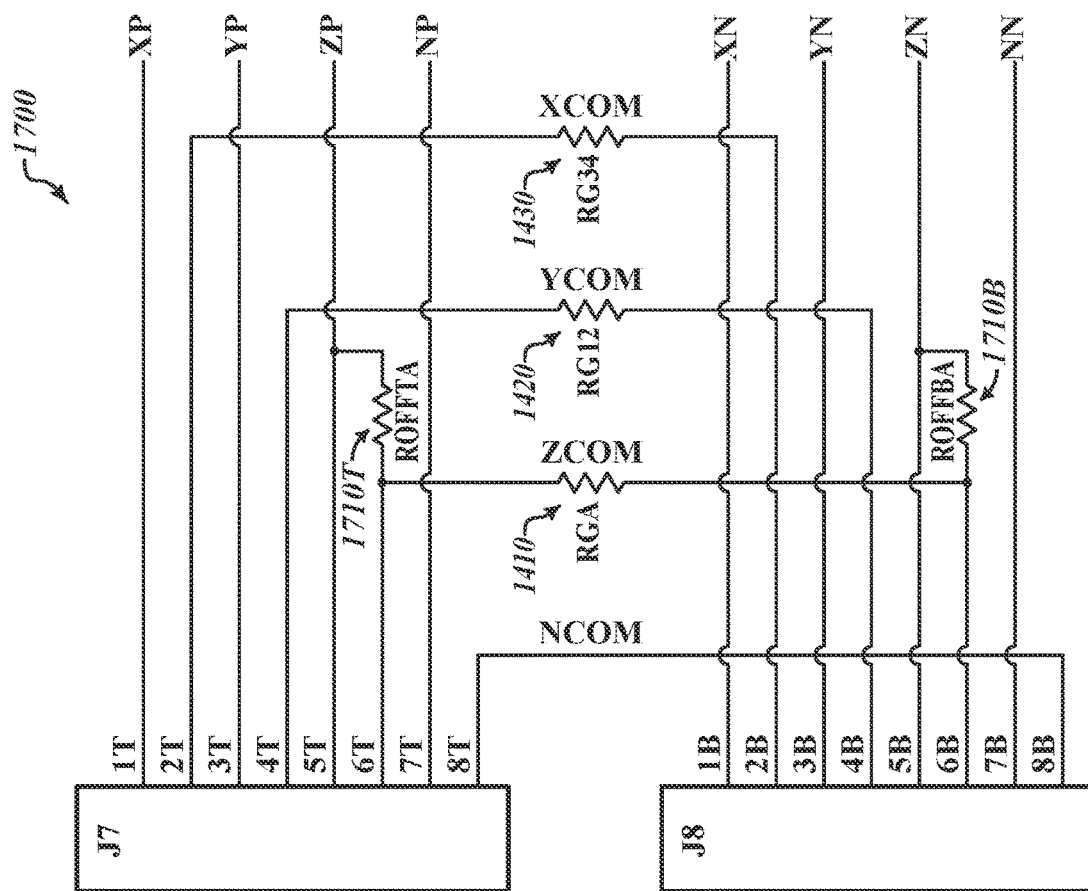
FIG. 17 is a diagram illustrating the connections of FIG. 14 as modified with a temperature dependent component similar to that of FIG. 16 as coupled in parallel with one of the axial sensing coils.
Figure 18:
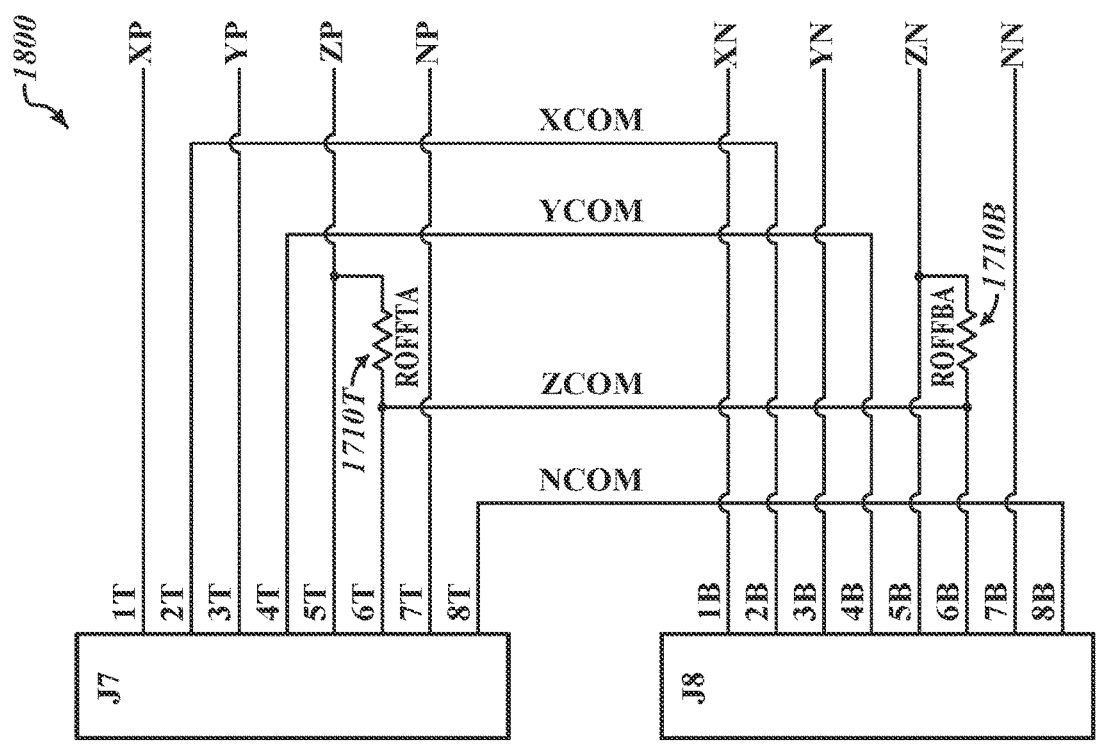
FIG. 18 is a diagram illustrating the connections of FIG. 12 as modified with a temperature dependent component similar to that of FIG. 16 as coupled in parallel with one of the axial sensing coils.

FIG. 17 is a diagram illustrating a sensing coil connection configuration 1700 including temperature dependent compensation portions 1410, 1420 and 1430 similar to those of FIG. 14, and additionally including compensation portions 1710T and 1710B (e.g., similar to those of FIG. 16), at least one of which may be a temperature dependent compensation portion. FIG. 18 is a diagram illustrating a sensing coil connection configuration 1800 including compensation portions 1810T and 1810B (similar to those of FIG. 16), at least one of which may be a temperature dependent compensation portion. The configurations of FIGS. 17 and 18 will be understood to be examples of implementations in relation to at least parts of FIG. 16, as applied to the connections illustrated in FIG. 12. Thus, the components and operations of FIGS. 17 and 18 will be understood in accordance with the above description of FIG. 16, except as otherwise described below.

As illustrated in FIG. 17, a compensation portion 1710T includes a component ROFFTA as coupled between the nodes 5T and 6T (i.e., and thus coupled in parallel with the axial coil TASC), and a compensation portion 1710B includes a component ROFFBA as coupled between the nodes 5B and 6B (i.e., and thus coupled in parallel with the axial coil BASC). The operations of the components 1710T and 1710B will be understood as corresponding to the operations of the components 1610T and 1610B of FIG. 16, as described above. The operations of the temperature dependent components RGA, RG12, and RG34 will be understood in accordance with the operations of the corresponding components of FIG. 14, as described above.

More specifically, in accordance with the examples as described above, a temperature dependent compensation portion 1710T may include a temperature dependent component ROFFBA, which may have a characteristic (e.g., a resistance) which decreases due to an increase in temperature (e.g., an NTC resistor), which may result in the ratio of current in the top axial sensing coil TASC to the current in the bottom axial sensing coil BASC increasing with temperature. In an alternative implementation, a temperature dependent compensation portion 1710T may include a temperature dependent component ROFFTA, which may have a characteristic (e.g., a resistance) which increases due to an increase in temperature (e.g., a PTC resistor), which similar to the configuration as described above, may result in the ratio of current in the top axial sensing coil TASC to the current in the bottom axial sensing coil BASC increasing with temperature.

The configuration of FIG. 18 will be understood to be similar to the configuration of FIG. 17, except as not including the temperature dependent components RGA, RG12, and RG34 in the respective signal lines ZCOM, YCOM, and XCOM. Thus, FIG. 18 illustrates a configuration as only including the compensation portions 1710T and 1710B as including the components ROFFTA and ROFFFBA, as described above with respect to FIGS. 16 and 17. Such a configuration may be utilized where a primary goal is to address a temperature dependent offset (e.g., primarily in the Z direction), and for which any temperature dependent gain issues (e.g., as at least partially addressed by the temperature dependent components RGA, RG12, and RG34 in FIG. 17) may be of relatively less concern and/or may be addressed by other techniques.

Figure 19:
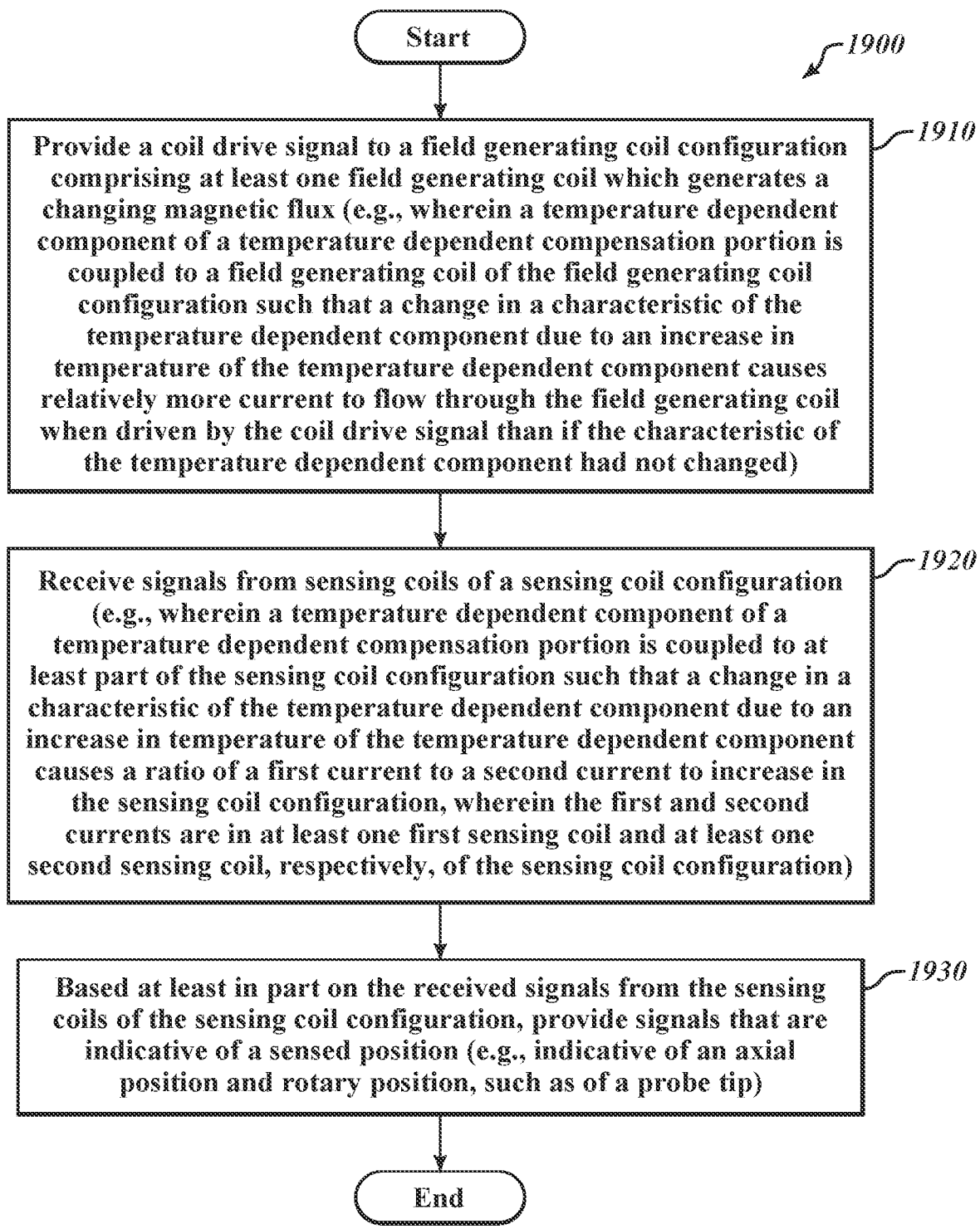
FIG. 19 is a flow diagram showing one example of a method for operating a measuring probe as configured in accordance with principles as disclosed herein.

FIG. 19 is a flow diagram showing one example of a method 1900 for operating a measuring probe as configured in accordance with principles as disclosed herein. At a block 1910, a coil drive signal is provided to a field generating coil configuration comprising at least one field generating coil which generates a changing magnetic flux. In various implementations, in accordance with principles as described herein, a temperature dependent component of a temperature dependent compensation portion may be coupled to a field generating coil of the field generating coil configuration such that a change in a characteristic of the temperature dependent component due to an increase in temperature of the temperature dependent component causes relatively more current to flow through the field generating coil when driven by the coil drive signal than if the characteristic of the temperature dependent component had not changed.

At a block 1920, signals from sensing coils of a sensing coil configuration are received. In various implementations, in accordance with principles as described herein, a temperature dependent component of a temperature dependent compensation portion may be coupled to at least part of the sensing coil configuration such that a change in a characteristic of the temperature dependent component due to an increase in temperature of the temperature dependent component causes a ratio of a first current to a second current to increase in the sensing coil configuration, wherein the first and second currents are in at least one first sensing coil and at least one second sensing coil, respectively, of the sensing coil configuration. At a block 1930, based at least in part on the received signals from the sensing coils of the sensing coil configuration, signals are provided that are indicative of a sensed position (e.g., indicative of an axial position and rotary position, such as of a probe tip, etc.)

The following describes various exemplary embodiments of the present disclosure with various features and elements annotated with reference numerals found in FIGS. 1-19. It should be understood that the reference numerals are added to indicate exemplary embodiments, and the features and elements are not limited to the particular embodiments illustrated in FIGS. 1-19.

As described above (e.g., at least in part in relation to FIGS. 1-6, 11A, 11B, etc.), in various implementations, a stylus position detection portion includes a field generating coil configuration 560 and a sensing coil configuration SCC. The field generating coil configuration comprises at least one field generating coil 561. The sensing coil configuration comprises top position sensing coils (e.g., as included in a top position sensing coil configuration TPSCC) and at least one top normalization sensing coil TNSC (e.g., as included in a top normalization sensing coil configuration TNSCC), bottom position sensing coils (e.g., as included in a bottom position sensing coil configuration BPSCC) and at least one bottom normalization sensing coil BNSC (e.g., as included in a bottom normalization sensing coil configuration BNSCC). The top position sensing coils comprise at least one top axial sensing coil TASC (e.g., as included in a top axial sensing coil configuration TASCC) and at least four top rotary sensing coils TRSC1-TRSC4. The bottom position sensing coils comprise at least one bottom axial sensing coil BASC (e.g., as included in a bottom axial sensing coil configuration BASCC) and at least four bottom rotary sensing coils BRSC1-BRSC4. In general, a top sensing coil configuration TSCC may include top sensing coils as including the top position sensing coils (e.g., TASC, TRSC1-TRSC4) and the at least one top normalization sensing coil (e.g., TNSC), while a bottom sensing coil configuration BSCC may include bottom sensing coils as including the bottom position sensing coils (e.g., BASC, BRSC1-BRSC4) and the at least one bottom normalization sensing coil (e.g., BNSC), as each included in the sensing coil configuration SCC.

In various implementations, a disruptor configuration (e.g., 350, 450, 550, 550') comprises a conductive disruptor element (e.g., 351, 451, 551, 551') that provides a disruptor area, wherein the disruptor element is located along the central axis CA in a disruptor motion volume MV and the disruptor element is coupled to the stylus suspension portion (e.g., by a coupling configuration 553). The disruptor element moves in the disruptor motion volume relative to an undeflected position UNDF in response to a deflection of the stylus suspension portion (e.g., the disruptor element moving over operating motion ranges +/Rz– along the axial direction in response to the axial motion, and over respective operating motion ranges +/–Rx and +/–Ry along orthogonal X and Y directions that are orthogonal to the axial direction in response to the rotary motion). The field generating coil configuration (e.g., 360, 460, 560) generates a changing magnetic flux generally along the axial direction in the disruptor motion volume MV in response to a coil drive signal, such as provided by a drive circuit (e.g., 700, 800, 900, 1000) of a drive signal generator 682.

As described above (e.g., at least in part in relation to FIGS. 7-10, etc.), in various implementations, the temperature dependent compensation portion (e.g., 710, 810, 910, 1010) comprises a temperature dependent component (e.g., R711, R811, R911, R1011), wherein the temperature dependent component is coupled to a field generating coil 561 of the field generating coil configuration 560 such that a change in a characteristic of the temperature dependent component due to an increase in temperature of the temperature dependent component causes relatively more current to flow through the field generating coil when driven by the coil drive signal than if the characteristic of the temperature dependent component had not changed. In various implementations, the temperature dependent component may be one of coupled in parallel or coupled in series with the field generating coil 561. In various implementations, the temperature dependent component may be a positive temperature coefficient (PTC) resistor for which the resistance increases as the temperature increases, and which is coupled in parallel with the field generating coil.

In various implementations, the field generating coil 561 has first and second coil terminals xlp and xln, and the measuring probe comprises a resonant circuit portion (e.g., RCP) connected to the first and second coil terminals. The resonant circuit portion comprises at least a first resonant circuit portion component (e.g., C1 or C1') and a second resonant circuit portion component (e.g., C2 or C2'), wherein the first resonant circuit portion component may be coupled between a first resonant circuit portion node A and a second resonant circuit portion node B, the first resonant circuit portion node may be separated from the first coil terminal by at least the second resonant circuit portion component. In various implementations, the resonant circuit portion may further comprise a third resonant circuit portion component (e.g., C3), wherein the second resonant circuit portion node may be separated from the second coil terminal by at least the third resonant circuit portion component.

In various implementations, the first resonant circuit portion component comprises a first resonant circuit capacitor C1 which may be connected between the first and second resonant circuit portion nodes. The second resonant circuit portion component comprises a second resonant circuit capacitor C2 which has a respective first terminal connected to the first resonant circuit portion node, and a respective second terminal connected to the first coil terminal. The third resonant circuit portion component comprises a third resonant circuit capacitor C3 which has a respective first terminal connected to the second resonant circuit portion node, and a respective second terminal connected to the second coil terminal.

In various implementations, an amplifier portion (e.g., AP or AP') may be connected to the first and second resonant circuit portion circuit nodes, the amplifier portion having an output impedance during operation. The amplifier portion may be configured to provide an oscillating drive signal at the first and second resonant circuit portion nodes. The amplifier portion AP may comprise first and second amplifier inputs (e.g., IN1 and IN2) and first and second amplifier outputs (e.g., OUT1 and OUT2), with the first amplifier output connected to the first resonant circuit portion node and the second amplifier output connected to the second resonant circuit portion node.

In various implementations, a first filter portion FP1 may be connected to the first coil terminal and the first amplifier input of the amplifier portion, and a second filter portion FP2 may be connected to the second coil terminal and the second amplifier input of the amplifier portion. In various implementations, the first filter portion comprises a first filter portion capacitor C4 and a first filter portion resistor R2 which are coupled in series between the first coil terminal and the first amplifier input, and the second filter portion comprises a second filter portion capacitor C5 and a second filter portion resistor R3 which are coupled in series between the second coil terminal and the second amplifier input.

In various implementations, the signal processing and control circuitry 680 may be configured to divide signals from the axial and rotary sensing coils (e.g., ASC and RSC) by signals from the normalization sensing coils (e.g., NSC) to determine the signals (e.g., APSOut and RPSOut) that are indicative of an axial position and a rotary position of the probe tip (e.g., 448, 548).

In various implementations, a method (e.g., 1900) is provided for operating the measuring probe for a coordinate measuring machine, wherein the method includes: providing (e.g., 1910) a coil drive signal to the field generating coil configuration to cause the at least one field generating coil to generate a changing magnetic flux, wherein a temperature dependent component of a temperature dependent compensation portion is coupled to a field generating coil of the field generating coil configuration such that a change in a characteristic of the temperature dependent component due to an increase in temperature of the temperature dependent component causes relatively more current to flow through the field generating coil when driven by the coil drive signal than if the characteristic of the temperature dependent component had not changed; and receiving (e.g., 1920) signals from sensing coils of the sensing coil configuration. In various implementations, the method may further include providing (e.g., 1930) signals (e.g., APSOut and RPSOut) that are indicative of a sensed position, as based at least in part on the received signals from the sensing coils of the sensing coil configuration.

In various implementations, a determining of the signals that are indicative of a sensed position comprises dividing signals from the axial and rotary sensing coils (e.g., ASC, RSC) by signals from the normalization sensing coils (e.g., NSC). In various implementations, the temperature dependent component (e.g., R711, R811) may be a positive temperature coefficient resistor for which the resistance increases as the temperature increases, and which may be coupled in parallel with the field generating coil 561, for which a ratio of current in the field generating coil in relation to current in the positive temperature coefficient resistor increases as the temperature of the positive temperature coefficient resistor increases.

In various implementations, a temperature dependent component as illustrated and described herein (e.g., in relation to any of the FIGS. 1-19) may be a temperature dependent resistor and the characteristic that changes may be the resistance of the temperature dependent resistor. In various implementations, the temperature dependent resistor may be a temperature coefficient resistor (e.g., a PTC or NTC resistor) and/or a thermistor. In various implementations, thermistors may be defined as having a resistance that is strongly dependent on temperature (e.g., more so than in standard resistors). Thermistors may generally be produced using powdered metal oxides, and/or as including a ceramic or polymer material (e.g., as opposed to pure metal).

As described above (e.g., at least in part in relation to FIGS. 11-18, etc.), in various implementations, a temperature dependent compensation portion (e.g., 1310, 1410, 1420, 1430, 1510, 1610T, 1610B, 1710T, 1710B) comprises a temperature dependent component (e.g., RG, RGA, RG12, RG34, RGN, ROFFTA, ROFFBA), wherein the temperature dependent component is coupled to at least part of the sensing coil configuration SCC (e.g., wherein SCC includes TSCC and BSCC) such that a change in a characteristic of the temperature dependent component due to an increase in temperature of the temperature dependent component causes a ratio of a first current to a second current to increase in the sensing coil configuration, wherein the first and second currents are in at least one first sensing coil and at least one second sensing coil, respectively, of the sensing coil configuration.

In various implementations, the at least one first sensing coil comprises a position sensing coil PSC (e.g., wherein TRSC1-TRSC4, BRSC1-BRSC4, TASC and BASC are all position sensing coils). In various implementations, the at least one second sensing coil comprises at least one of a normalization sensing coil (e.g., TNSC, BNSC) or an axial sensing coil (e.g., TASC, BASC).

In various implementations, the at least one second sensing coil comprises a normalization sensing coil (e.g., TNSC, BNSC). In various implementations, the temperature dependent component may be at least one of: a negative temperature coefficient resistor (e.g., RGA, RG12, RG34) coupled in series with the at least one first sensing coil (e.g., TRSC1, TRSC2, TRSC3, TRSC4, BRSC1, BRSC2, BRSC3, BRSC4, TASC, BASC), for which the resistance decreases as the temperature increases; or a positive temperature coefficient resistor (e.g., RGN) coupled in series with the normalization sensing coil (e.g., TNSC, BNSC), for which the resistance increases as the temperature increases.

In various implementations, the at least one first sensing coil comprises a first top position sensing coil and a first bottom position sensing coil, for which the temperature dependent component, the first top position sensing coil and the first bottom position sensing coil are coupled in series. In various implementations, the temperature dependent component may be coupled between the first top position sensing coil and the first bottom position sensing coil (e.g., RGA as coupled in series between TASC and BASC, R12 as coupled in series between TRSC1 and BRSC1, and R34 as coupled in series between TRSC3 and BRSC3).

In various implementations, the temperature dependent component may be a first temperature dependent component RGA; the first top position sensing coil comprises a top axial sensing coil TASC; and the first bottom position sensing coil comprises a bottom axial sensing coil BASC. In various implementations, the measuring probe may further comprise: a second temperature dependent component R12 coupled in series with first and second top rotary sensing coils TRSC1 and TRSC2 and first and second bottom rotary sensing coils BRSC1 and BRSC2; and a third temperature dependent component R34 coupled in series with third and fourth top rotary sensing coils TRSC3 and TRSC4 and third and fourth bottom rotary sensing coils BRSC3 and BRSC4. In various implementations, each of the first, second and third temperature dependent components may be a negative temperature coefficient resistor for which the resistance decreases as the temperature increases.

In various implementations, the at least one second sensing coil comprises a first top normalization sensing coil TNSC and a first bottom normalization sensing coil BNSC, for which the temperature dependent component RGN, the first top normalization sensing coil TNSC and the first bottom normalization sensing coil BNSC are coupled in series. The temperature dependent component may be coupled between the first top normalization sensing coil and the first bottom normalization sensing coil. The temperature dependent component may be a positive temperature coefficient resistor for which the resistance increases as the temperature increases.

In various implementations, the at least one first sensing coil comprises a top axial sensing coil TASC; the at least one second sensing coil comprises a bottom axial sensing coil BASC; and the temperature dependent component (e.g., ROFFTA or ROFFBA) may be coupled in parallel with the either the top axial sensing coil or the bottom axial sensing coil. In various implementations, the temperature dependent component ROFFBA may be coupled in parallel with the bottom axial sensing coil and the temperature dependent component may be a negative temperature coefficient resistor for which the resistance decreases as the temperature increases. In various implementations, the temperature dependent component ROFFTA may be coupled in parallel with the top axial sensing coil and the temperature dependent component may be a positive temperature coefficient resistor for which the resistance increases as the temperature increases.

In various implementations, the temperature dependent component may be a temperature dependent resistor, and the characteristic that changes may be the resistance of the temperature dependent component. In various implementations, the temperature dependent resistor may be a temperature coefficient resistor and/or a thermistor. In various implementations, the temperature dependent component may be one of coupled in parallel or coupled in series with a sensing coil of either the at least one first sensing coil or the least one second sensing coil.

In various implementations, a method (e.g., 1900) is provided for operating a measuring probe for a coordinate measuring machine, wherein the method includes: providing (e.g., 1910) a coil drive signal to the field generating coil configuration to cause the at least one field generating coil to generate a changing magnetic flux; and receiving (e.g., 1920) signals from sensing coils of the sensing coil configuration, wherein a temperature dependent component of a temperature dependent compensation portion is coupled to at least part of the sensing coil configuration such that a change in a characteristic of the temperature dependent component due to an increase in temperature of the temperature dependent component causes a ratio of a first current to a second current to increase in the sensing coil configuration, wherein the first and second currents are in at least one first sensing coil and at least one second sensing coil, respectively, of the sensing coil configuration. In various implementations, the method may further include providing (e.g., 1930) signals (e.g., APSOut, RPSOut, such as a Z signal and X, Y signals, such as $\Delta Z$ and $\Delta X$, $\Delta Y$ signals such as determined in accordance with EQUATIONS 5-7 and/or 8-10) that are indicative of a sensed position (e.g., indicative of an axial position and rotary position, such as of a probe tip), as based at least in part on the received signals (e.g., SIGBASCC, SIGTASCC, SIGTRSC3, SIGBRSC3, SIGTRSC4, SIGBRSC4, SIGTRSC2, SIGBRSC2, SIGTRSC1, SIGBRSC1, SIGTNSCC, SIGBNSCC and/or ZP, ZN, XP, XN, YP, YN, NP, NN) from the sensing coils of the sensing coil configuration.

In various implementations a system (e.g., 100) is provided, including the measuring probe (e.g., 300), a drive mechanism (e.g., 220), and an attachment portion (e.g., 224) attaching the measuring probe to the drive mechanism. The drive mechanism is configured to move the measuring probe three-dimensionally for moving the probe tip (e.g., 448, 548) along a surface of a workpiece (e.g., W) for measuring the workpiece.

In various implementations, some or all of the components and/or connections of the drive circuits of FIGS. 7-10 (e.g., as coupled to the field generating coil 561) may be included in a drive signal generator (e.g., drive signal generator 682 of FIG. 6) and/or in other locations or portions of the circuitry. In various implementations, some or all of the components and/or connections of FIGS. 11-18 (e.g., as coupled to and/or between, etc. the sensing coils) may be included in an amplification and/or switching portion (e.g., amplification/switching portion 683 of FIG. 6) and/or in other locations or portions of the circuitry.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

What is claimed is:

1. A measuring probe for a coordinate measuring machine, the measuring probe comprising:
   a stylus suspension portion, comprising:
      a stylus coupling portion that is configured to be rigidly coupled to a stylus with a probe tip; and
      a stylus motion mechanism that is configured to enable axial motion of the stylus coupling portion along an axial direction, and rotary motion of the stylus coupling portion about a rotation center;
   a stylus position detection portion arranged along a central axis that is parallel to the axial direction and nominally aligned with the rotation center, comprising:
      a field generating coil configuration comprising at least one field generating coil;
      a sensing coil configuration, comprising:
         top position sensing coils, comprising:
            at least one top axial sensing coil;
            at least four top rotary sensing coils;
         at least one top normalization sensing coil;
         bottom position sensing coils, comprising:
            at least one bottom axial sensing coil;
            at least four bottom rotary sensing coils; and
         at least one bottom normalization sensing coil;
   a disruptor configuration comprising a conductive disruptor element that provides a disruptor area, wherein the disruptor element is located along the central axis in a disruptor motion volume and the disruptor element is coupled to the stylus suspension portion, wherein the disruptor element moves in the disruptor motion volume relative to an undeflected position in response to a deflection of the stylus suspension portion, the field generating coil configuration generating a changing magnetic flux generally along the axial direction in the disruptor motion volume in response to a coil drive signal;
   signal processing and control circuitry that is operably connected to the coils of the stylus position detection portion to provide the coil drive signal and configured to receive signals comprising respective signal components provided by the respective sensing coils, and provide signals indicative of an axial position and a rotary position of the probe tip; and:
   a temperature dependent compensation portion comprising a temperature dependent component, wherein the temperature dependent component is coupled to a field generating coil of the field generating coil configuration such that a change in a characteristic of the temperature dependent component due to an increase in temperature of the temperature dependent component causes relatively more current to flow through the field generating coil when driven by the coil drive signal than if the characteristic of the temperature dependent component had not changed.

2. The measuring probe of claim 1, wherein the temperature dependent component is a temperature dependent resistor and the characteristic that changes is the resistance of the temperature dependent resistor.

3. The measuring probe of claim 2, wherein the temperature dependent resistor is a temperature coefficient resistor.

4. The measuring probe of claim 2, wherein the temperature dependent resistor is a thermistor.

5. The measuring probe of claim 1, wherein the temperature dependent component is one of coupled in parallel or coupled in series with the field generating coil.

6. The measuring probe of claim 1, wherein the temperature dependent component is a positive temperature coefficient resistor for which the resistance increases as the temperature increases.

7. The measuring probe of claim 6, wherein the positive temperature coefficient resistor is coupled in parallel with the field generating coil.

8. The measuring probe of claim 1, wherein:
   the field generating coil has first and second coil terminals; and
   the measuring probe comprises a resonant circuit portion connected to the first and second coil terminals, the resonant circuit portion comprising at least a first resonant circuit portion component and a second resonant circuit portion component, wherein the first resonant circuit portion component is coupled between a first resonant circuit portion node and a second resonant circuit portion node, the first resonant circuit portion node is separated from the first coil terminal by at least the second resonant circuit portion component.

9. The measuring probe of claim 8, wherein the resonant circuit portion further comprises a third resonant circuit portion component, wherein the second resonant circuit portion node is separated from the second coil terminal by at least the third resonant circuit portion component.

10. The measuring probe of claim 9, wherein:
   the first resonant circuit portion component comprises a first resonant circuit capacitor which is connected between the first and second resonant circuit portion nodes; and
   the second resonant circuit portion component comprises a second resonant circuit capacitor which has a respective first terminal connected to the first resonant circuit portion node, and a respective second terminal connected to the first coil terminal; and the third resonant circuit portion component comprises a third resonant circuit capacitor which has a respective first terminal connected to the second resonant circuit portion node, and a respective second terminal connected to the second coil terminal.

11. The measuring probe of claim 8, further comprising an amplifier portion connected to the first and second resonant circuit portion circuit nodes, the amplifier portion having an output impedance during operation, wherein the amplifier portion is configured to provide an oscillating drive signal at the first and second resonant circuit portion nodes, the amplifier portion comprising first and second amplifier inputs and first and second amplifier outputs, with the first amplifier output connected to the first resonant circuit portion node and the second amplifier output connected to the second resonant circuit portion node.

12. The measuring probe of claim 11, further comprising:
a first filter portion connected to the first coil terminal and the first amplifier input of the amplifier portion; and
a second filter portion connected to the second coil terminal and the second amplifier input of the amplifier portion.

13. The measuring probe of claim 12, wherein:
the first filter portion comprises a first filter portion capacitor and a first filter portion resistor which are coupled in series between the first coil terminal and the first amplifier input; and
the second filter portion comprises a second filter portion capacitor and a second filter portion resistor which are coupled in series between the second coil terminal and the second amplifier input.

14. The measuring probe of claim 1, wherein the signal processing and control circuitry is configured to divide signals from the axial and rotary sensing coils by signals from the normalization sensing coils to determine the signals that are indicative of an axial position and a rotary position of the probe tip.

15. A method of operating a measuring probe for a coordinate measuring machine,
the measuring probe comprising:
a stylus suspension portion, comprising:
a stylus coupling portion that is configured to be rigidly coupled to a stylus with a probe tip; and
a stylus motion mechanism that is configured to enable axial motion of the stylus coupling portion along an axial direction, and rotary motion of the stylus coupling portion about a rotation center;
a stylus position detection portion arranged along a central axis that is parallel to the axial direction and nominally aligned with the rotation center, comprising:
a field generating coil configuration comprising at least one field generating coil;
a sensing coil configuration, comprising:
top position sensing coils, comprising:
at least one top axial sensing coil;
at least four top rotary sensing coils;
at least one top normalization sensing coil;
bottom position sensing coils, comprising:
at least one bottom axial sensing coil;
at least four bottom rotary sensing coils; and
at least one bottom normalization sensing coil;
a disruptor configuration comprising a conductive disruptor element that provides a disruptor area, wherein the disruptor element is located along the central axis in a disruptor motion volume and the disruptor element is coupled to the stylus suspension portion, wherein the disruptor element moves in the disruptor motion volume relative to an undeflected position in response to a deflection of the stylus suspension portion, the field generating coil configuration generating a changing magnetic flux generally along the axial direction in the disruptor motion volume in response to a coil drive signal;
signal processing and control circuitry that is operably connected to the coils of the stylus position detection portion to provide the coil drive signal and configured to receive signals comprising respective signal components provided by the respective sensing coils, and provide signals indicative of an axial position and a rotary position of the probe tip; and;
the method comprising:
providing a coil drive signal to the field generating coil configuration to cause the at least one field generating coil to generate a changing magnetic flux, wherein a temperature dependent component of a temperature dependent compensation portion is coupled to a field generating coil of the field generating coil configuration such that a change in a characteristic of the temperature dependent component due to an increase in temperature of the temperature dependent component causes relatively more current to flow through the field generating coil when driven by the coil drive signal than if the characteristic of the temperature dependent component had not changed; and
receiving signals from sensing coils of the sensing coil configuration.

16. The method of claim 15, further comprising providing signals that are indicative of a sensed position, as based at least in part on the received signals from the sensing coils of the sensing coil configuration.

17. The method of claim 16, wherein a determining of the signals that are indicative of a sensed position comprises dividing signals from the axial and rotary sensing coils by signals from the normalization sensing coils.

18. The method of claim 15, wherein the temperature dependent component is a positive temperature coefficient resistor for which the resistance increases as the temperature increases.

19. The method of claim 18, wherein the positive temperature coefficient resistor is coupled in parallel with the field generating coil, for which a ratio of current in the field generating coil in relation to current in the positive temperature coefficient resistor increases as the temperature of the positive temperature coefficient resistor increases.

20. A system, comprising:
a measuring probe;
a drive mechanism configured to move the measuring probe three-dimensionally for moving a probe tip along a surface of a workpiece for measuring the workpiece; and
an attachment portion attaching the measuring probe to the drive mechanism, wherein the measuring probe comprises:
a stylus suspension portion, comprising:
a stylus coupling portion that is configured to be rigidly coupled to a stylus with a probe tip; and
a stylus motion mechanism that is configured to enable axial motion of the stylus coupling portion along an axial direction, and rotary motion of the stylus coupling portion about a rotation center;

a stylus position detection portion arranged along a central axis that is parallel to the axial direction and nominally aligned with the rotation center, comprising:
   a field generating coil configuration comprising at least one field generating coil;
   a sensing coil configuration, comprising:
     top position sensing coils, comprising:
       at least one top axial sensing coil;
       at least four top rotary sensing coils; and
     at least one top normalization sensing coil;
     bottom position sensing coils, comprising:
       at least one bottom axial sensing coil;
       at least four bottom rotary sensing coils; and
     at least one bottom normalization sensing coil;
a disruptor configuration comprising a conductive disruptor element that provides a disruptor area, wherein the disruptor element is located along the central axis in a disruptor motion volume and the disruptor element is coupled to the stylus suspension portion, wherein the disruptor element moves in the disruptor motion volume relative to an undeflected position in response to a deflection of the stylus suspension portion, the field generating coil configuration generating a changing magnetic flux generally along the axial direction in the disruptor motion volume in response to a coil drive signal;

signal processing and control circuitry that is operably connected to the coils of the stylus position detection portion to provide the coil drive signal and configured to receive signals comprising respective signal components provided by the respective sensing coils, and provide signals indicative of an axial position and a rotary position of the probe tip; and:

a temperature dependent compensation portion comprising a temperature dependent component, wherein the temperature dependent component is coupled to a field generating coil of the field generating coil configuration such that a change in a characteristic of the temperature dependent component due to an increase in temperature of the temperature dependent component causes relatively more current to flow through the field generating coil when driven by the coil drive signal than if the characteristic of the temperature dependent component had not changed.

\* \* \* \* \*